(12) United States Patent
McDermott et al.

(10) Patent No.: US 6,383,257 B1
(45) Date of Patent: May 7, 2002

(54) RECLAMATION AND SEPARATION OF PERFLUOROCARBONS USING CONDENSATION

(75) Inventors: Wayne Thomas McDermott, Fogelsville; Richard Carl Ockovic, Northampton; Alexander Schwarz, Bethlehem; Rakesh Agrawal, Emmaus, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/542,995

(22) Filed: Apr. 4, 2000

(51) Int. Cl.⁷ .................. B01D 53/22; B01D 53/04; B01D 53/14
(52) U.S. Cl. ............... 95/41; 62/616; 62/640; 62/655; 95/42; 95/45; 95/50; 95/90; 95/232; 95/288; 96/4; 96/134; 96/243
(58) Field of Search ............... 62/606, 616, 617, 62/640, 655; 95/39, 41, 45, 47–55, 90, 116, 130, 135–137, 139, 232, 235, 236, 288, 290; 96/4, 7–14, 134, 243, 355, 361, 371

(56) References Cited

U.S. PATENT DOCUMENTS

| | | | |
|---|---|---|---|
| 4,176,526 A | | 12/1979 | Missimer .................. 62/278 |
| 4,668,261 A | | 5/1987 | Chatzipetros et al. ......... 62/37 |
| 4,841,732 A | * | 6/1989 | Sarcia ..................... 62/640 |
| 4,994,094 A | * | 2/1991 | Behling et al. ............. 95/39 |
| 5,049,174 A | * | 9/1991 | Thorogood et al. ....... 62/655 X |
| 5,089,033 A | | 2/1992 | Wikmans ................... 55/16 |
| 5,199,962 A | | 4/1993 | Wijmans ................... 55/16 |
| 5,205,843 A | | 4/1993 | Kaschemekat et al. ........ 55/16 |
| 5,261,250 A | | 11/1993 | Missimer .................. 62/55.5 |
| 5,374,300 A | | 12/1994 | Kaschemekat et al. ........ 95/39 |
| 5,398,513 A | | 3/1995 | Klobucar .................. 62/18 |
| 5,533,338 A | | 7/1996 | Lee et al. ................ 62/638 |
| 5,540,057 A | | 7/1996 | Cheng .................... 62/625 |
| 5,611,842 A | * | 3/1997 | Friesen et al. ............ 95/45 X |
| 5,617,727 A | | 4/1997 | Zito ..................... 62/55.5 |
| 5,755,855 A | | 5/1998 | Baker et al. .............. 95/39 |
| 5,759,237 A | * | 6/1998 | Li et al. ................. 95/41 |
| 5,772,733 A | * | 6/1998 | Lokhandwala et al. ........ 95/39 |
| 5,772,734 A | * | 6/1998 | Baker et al. .............. 95/45 X |
| 5,779,763 A | | 7/1998 | Pinnau et al. ............. 95/39 |
| 5,799,509 A | | 9/1998 | Finley et al. ............. 62/638 |
| 5,958,138 A | * | 9/1999 | Tomita et al. ............ 62/616 X |
| 6,224,677 B1 | * | 5/2001 | Nozawa et al. ............ 95/41 X |

OTHER PUBLICATIONS

"CRYO–CONDAP®", Air Products and Chemicals, Inc. Sales Literature.
"RESOLV™", Chemical Vapor Recovery Systems, Air Products and Chemicals, Inc. Sales Literature.
"Characterization of two Polycold Trapping Units for the Recovery of C2F6: Report of Tests Conducted at Polycold, San Rafael, CA", Mar., 1994, DuPont, Zyron PFC Emmissions Reduction Second Status Report.

* cited by examiner

*Primary Examiner*—Robert H. Spitzer
(74) *Attorney, Agent, or Firm*—Geoffrey L. Chase

(57) ABSTRACT

An apparatus and process for separating perfluorocarbon compounds from a gas mixture passes an incoming stream of a gas into a cold trap, the gas stream including a plurality of perfluorocarbon compounds. The gas mixture is cooled within the cold trap to a temperature below −100° C. to produce a condensate that is enriched in at least one perfluorocarbon compound and a non-condensed stream from which the condensate was separated. The condensate is withdrawn from the cold trap. The condensate may be withdrawn by warming the cold trap to vaporize the condensate and thereafter flowing the vaporized condensate into a storage vessel. The non-condensed stream may be vented to the atmosphere, re-circulated into the cold trap or flowed through subsequent separation processes to extract additional perfluorocarbon compounds.

50 Claims, 14 Drawing Sheets

RECLAMATION AND SEPARATION OF PERFLUOROCARBONS USING CONDENSATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Perfluorocarbons (PFCs) have many favorable properties such as good stability, non-flammability, low surface tension and low solubility. These favorable properties make perfluorocarbons useful in many applications such as lubricants, solvents, refrigerants, hydraulic fluids, fire extinguishers, insulators and cleaning agents. In the past, perfluorocarbons were manufactured, used and discharged to the environment freely. However, it was recognized some years ago that their inertness, besides making them materials of choice for the uses above, also causes them to break down extremely slowly in the upper atmosphere, giving them the potential to create global warming.

For example, many processes involved in the fabrication of semiconductors, e.g., etching, deposition, oxidation, are carried out within closed reaction chambers and involve the use of perfluorocarbons. These chambers are also referred to as tools. Typically, silicon wafers that are fabricated into semiconductors are placed into these chambers, or tools, one-by-one, or in some cases, more than one at a time. After a processing step is completed, the silicon wafers are removed from one chamber, usually by robotic means, and passed to the next chamber (or tool) where they undergo the next step in the process. Over time, as a result of these processing steps, the internal walls of the chambers become contaminated as a result of the various gases and other materials that are present in the chamber during the processing steps. Thus, periodically, the internal walls of these chambers must be cleaned. One manner for cleaning these chambers is through the use of perfluorocarbons (PFCs). PFCs are introduced into the chamber for cleaning purposes while the chamber is devoid of silicon wafers and is between processing steps. The cleaning process includes exposing the chamber to PFCs, sometimes in combination with high temperatures. At the end of the cleaning process, an effluent stream containing contaminant material and PFC cleaning agents is removed from the processing chamber by a vacuum pump located downstream of the chamber and pumped away.

These effluent streams can contain mixtures of global warming perfluorocarbon compounds such as $C_2F_6$, $CF_4$, $NF_3$, $SF_6$, $CHF_3$, $C_3H_8$, $CH_3F$ and $C_2HF_5$, reactive compounds such as HF, $F_2$, $COF_2$, $SiF_4$ and $SiH_4$, and environmentally benign atmospheric gases such as $N_2$, $O_2$, $CO_2$, $H_2O$ and $N_2O$. Many of these reactive compounds result from reaction between the PFCs used in the cleaning process and the contaminants deposited on the walls of the reaction chamber. Typical effluent streams exiting the reaction chamber during cleaning contain approximately 50% PFCs, and 50% nitrogen and other atmospheric gases and flow at a typical rate of 2,000 standard $cm^3$ per minute. The stream is typically under a vacuum at a pressure of approximately 10 torr to 100 torr. Since these effluent streams usually include reactive compounds that can damage the vacuum pump during removal from the chamber, the effluent stream is usually diluted to a proportion of approximately 1% PFCs by mole and approximately 99% $N_2$ and other atmospheric gases prior to entering the vacuum pump. Dilution enables the vacuum pump to operate more efficiently.

Dilution is accomplished by adding approximately 50,000 to 100,000 standard $cm^3$ per minute (50 to 100 standard liters per minute) of $N_2$ to the effluent stream. This heavy dilution with nitrogen minimizes the damaging effects of reactive compounds, and is necessary for efficient operation of the vacuum pump. The diluted stream exits the vacuum pump at an approximate pressure of 760 torr.

Prior to atmospheric venting, the vacuum pump effluent stream must be treated. Environmental considerations require removal of damaging compounds from the semiconductor effluent stream prior to venting to the atmosphere. However, efficient separation of the low quantities of damaging compounds, e.g., 1%, from the comparatively high quantities, e.g., approximately 99%, of environmentally benign nitrogen and other atmospheric gases becomes more difficult after the dilution step. Corrosive components can be removed from these effluent streams using well established scrubbing technology. Reactive components, such as $SiH_4$, can be removed using combustion into less harmful compounds. However, until recently, PFC compounds were frequently vented without emission control. Recent efforts to reduce emission of these global warming compounds have led to the use of emission control methods such as adsorption, membrane separation or cryogenic distillation technologies and devices for carrying out these methods. Such emission control methods and devices provide means to separate the PFCs from the atmospheric gases (e.g., $N_2$). As shown in the sequence below, these emission control devices are typically located after the corrosive gas scrubber, at which point atmospheric gases typically comprise approximately 99% of the mixture, the balance consisting largely of PFC compounds.

> REACTION CHAMBER (TOOL)→VACUUM PUMP→SCRUBBER→(99% Atmospheric Gases, 1% PFCS)→EMISSION CONTROL DEVICE (Adsorption Device or Membrane Separation Device)→VENT.

As a typical example, a single-stage membrane separation device can provide a PFC-enriched mixture containing approximately 80% to 95% atmospheric gases. Re-use of the PFCs requires additional steps of membrane separation for increased purity. Such additional treatment can be accomplished using additional membrane separation stages to reduce atmospheric gases levels to approximately 1%, followed by cryogenic distillation. The distillation process can then separate valuable and reusable PFC compounds, such as $C_2F_6$ from the other PFC compounds and atmospheric gases to produce a high purity level, e.g., approximately 99.999%. In many instances, this level of purity is necessary for reuse in semiconductor processing.

However, membrane and distillation separation methods require expensive equipment and may entail high operating costs. A reduction or elimination of such expensive membrane and distillation separation equipment should improve the economic viability of PFC abatement and recovery.

Under prior art inventions, membrane separation devices have been combined with cold trap condensers to provide separation of condensable components from atmospheric gases. For example, U.S. Pat. Nos. 5,779,763 (Pinnau et al.); U.S. Pat. No. 5,199,962 (Wijmans); U.S. Pat. No. 5,089,033 (Wijmans); U.S. Pat. No. 5,205,843 (Kaschemekat et al.);

and, U.S. Pat. No. 5,374,300 (Kaschemekat et al.), all assigned to Membrane Technology and Research, Inc. (MTR) of Menlo Park, Calif., teach methods for separating or recovering condensable components from a gas stream using a condensation step in combination with one or more membrane separation stages. U.S. Pat. No. 5,779,763 (Pinnau et al.) in particular teaches methods for separating perfluorinated compounds, including perfluorocarbons, from atmospheric gas streams.

Separation by condensation methods requires the gas stream to be cooled to the dew point temperature of the condensable components to effectuate condensation of these components. The dew point temperature for the mixture tends to increase as the pressure of the gas mixture increases. In order to reduce cooling requirements, the processes discussed in the MTR patents all involve condensation at temperatures above −100° C. (−148° F.). U.S. Pat. No. 5,779,763 (Pinnau et al.) which is specifically directed towards recovery of PFCs from semiconductor tool effluent streams, claims condensation at temperatures above −30° C. (−22° F.). These temperatures are considerably above the normal condensation temperatures of pure PFC compounds. In order to accomplish condensation of PFCs at this relatively high temperature, the gas stream must first be compressed to pressures as high as 500 p.s.i.a. Because the processes discussed in the MTR patents require relatively high working pressures to obtain condensation, the MTR processes require substantial compression equipment thus increasing operating costs.

It is desired to provide a process for reclaiming and separating condensable components from gas streams that is efficient.

It is further desired to provide a process for reclaiming and separating condensable components from gas streams that results in a high percentage of the condensable component being reclaimed.

It is further desired to provide a process for reclaiming and separating condensable components from gas streams that reduces emission of harmful gases to the environment.

It is further desired to provide a process for reclaiming and separating condensable components from gas streams that operates at cryogenic temperatures and low pressures.

It is further desired to provide a process for reclaiming and separating condensable components from gas streams that utilizes cold trapping.

It is further desired to provide a process for reclaiming and separating condensable components from gas streams that utilizes cold trapping in combination with one or more membrane separation devices and/or adsorption devices.

BRIEF SUMMARY OF THE INVENTION

The present invention is a process for separating perfluorocarbon compounds from a gas mixture. A first embodiment of the process comprises multiple steps. The first step is the passing of an incoming stream of a gas mixture into a cold trap, the gas stream including a plurality of perfluorocarbon compounds. The gas mixture is cooled within the cold trap to a temperature below −100° C. to produce a condensate that is enriched in at least one perfluorocarbon compound and a non-condensed gas stream from which the condensate was separated. The perfluorocarbon compound enriched condensate is then withdrawn from the cold trap. The condensate may be withdrawn by warming the cold trap to vaporize the condensate and thereafter flowing the vaporized condensate into a storage vessel. The non-condensed stream may be vented to the atmosphere, re-circulated into the cold trap or flowed through subsequent separation processes to extract additional perfluorocarbon compounds.

In a variation of the first embodiment, the cooling step is carried out within the cold trap at a temperature of approximately −173° C. and a pressure of approximately 2300 torr.

In another variation of the first embodiment, the cooling step is carried out at a pressure between 1 torr and 2300 torr.

In another variation of the first embodiment, the cooling step is carried out at a temperature between −100° C. and −1900° C.

In another variation of the first embodiment, the cooling step is carried out by thermally contacting the cold trap with a coolant medium. The coolant medium could be a cryogen. The coolant medium could be in a closed cycle cryogenic system or in an open system.

In another variation of the first embodiment, the cooling step is carried out at a preferred temperature of approximately −176° C.

In another variation of the first embodiment, the process comprises the further step of membrane treating the incoming stream of the gas mixture in a membrane separation step to separate atmospheric gases from the gas mixture and venting the atmospheric gases to the atmosphere to provide to the cold trap a gas mixture enriched in a plurality of perfluorocarbon compounds.

In another variation of the first embodiment, corrosive components are removed from the incoming gas mixture stream by means of scrubbing prior to flowing the gas mixture to the cold trap.

In another variation of the first embodiment, atmospheric gases are removed from the incoming gas mixture stream by means of adsorption prior to entering the cold trap.

In another variation of the first embodiment, atmospheric gases are removed from the incoming gas mixture stream by means of a membrane separation step prior to entering the cold trap.

In another variation of the first embodiment, the membrane separation step takes place in multiple stages.

In other variations of the first embodiment, atmospheric gases and condensate are removed from the incoming gas mixture stream by membrane separation steps performed prior to and following a cold trapping step. In other variations of the first embodiment of the present invention, one or more of these membrane separation steps may be in multiple stages.

In another variation of the first embodiment, condensate is removed from the cold trap by warming the condensate and flowing it through a surge vessel and compressor and into a pressurized storage vessel. In another variation of the first embodiment, the surge vessel and compressor are removed from the process flow and the condensate is heated to a temperature sufficient to provide a driving force to flow the heated condensate into a storage vessel. In another variation of the first embodiment, the cold trap is warmed by removing it from a cryogenic source or exposing it to a source of heat.

In another variation of the first embodiment, the cooling step is carried out in multiple cold traps, e.g., two cold traps. The gas mixture is cooled within the first cold trap to produce a first condensate enriched in a first perfluorocarbon compound and to produce a non-condensed stream. The non-condensed stream is then flowed to a second cold trap wherein it is cooled to produce a second condensate enriched in a plurality of perfluorocarbon compounds.

In another variation of the first embodiment, the first cold trap is cooled to a temperature of approximately −139° C. and is maintained at a pressure of approximately 100 torr while the second cold trap is cooled to a temperature of approximately −181° C. and is maintained at a pressure of approximately 100 torr.

In another variation of the first embodiment, the first cold trap is cooled to a temperature of approximately −154° C. and is maintained at a pressure of approximately 100 torr and the second cold trap is cooled to a temperature of approximately −181° C. and is maintained at a pressure of approximately 100 torr.

In a second embodiment of the present invention, the cold trap is utilized in a two-step process. In a first step a gas mixture is introduced into a cold trap to produce a condensate. In a second step, pressure is reduced within the cold trap to withdraw from the condensate a first set of perfluorocarbon compounds having a lower boiling point and to retain within the cold trap a second set of perfluorocarbon compounds having a higher boiling point. After the pressure reduction step is completed, the retained condensate may be removed from the cold trap.

In a third embodiment of the present invention, the cold trap is utilized in another two-step process. Under this two-step process, in a first step, a gas mixture is introduced into a cold trap to produce a condensate, the condensate including a first set of perfluorocarbon compounds having a lower boiling point and a second set having a higher boiling point. In a second step, the cold trap is warmed to a predetermined temperature higher than the boiling point of the first set of perfluorocarbon compounds but lower than the boiling point of the second set to withdraw from the condensate the first set of perfluorocarbon compounds and to retain the second set within the cold trap. After the first set of perfluorocarbon compounds has been withdrawn, the retained perfluorocarbon compounds may be removed from the cold trap.

The present invention also includes several apparatuses for separating perfluorocarbon compounds from a gas mixture. A first apparatus includes a means for passing an incoming stream of a gas mixture into a cold trap, the gas mixture containing a plurality of perfluorocarbon compounds. The first apparatus also includes means for cooling the gas mixture to a temperature below −100° C. so that a condensate is produced, the condensate being enriched in at least one perfluorocarbon compound. The apparatus also includes a means for withdrawing from the cold trap the condensate enriched in the at least one perfluorocarbon compound. The remaining two apparatuses perform the cold trapping process in two different two-step approaches, one using a vacuum, the other using heating.

BRIEF DESCRIPTION OF SEVERAL VIEWS OF THE DRAWINGS

FIG. 5b is a schematic flow diagram of the variation shown in FIG. 5a subjected to a gas mixture comprising different constituent gases than described in connection with FIG. 5a;

DETAILED DESCRIPTION OF THE INVENTION

The method of the present invention, commonly referred to as cold trapping, has been successfully applied in applications unrelated to the removal of perfluorocarbon compounds. Cold trapping also has been utilized for removing perfluorocarbon compounds from atmospheric gases at temperatures significantly above −100° C. (−148° F.) by significantly increasing the pressure of these gases. The method of the present invention removes perfluorocarbon compounds and other reactive compounds from atmospheric gases at considerably lower temperatures and pressures. Since the process of the present invention is performed at considerably lower temperatures, the dew points for various stream constituents can be reached without substantial compression thus saving on costly compression equipment. Moreover, the elimination of compression equipment is desirable because such equipment can introduce contaminants into the process. The subject invention also combines with the low temperature condensation step, one or several membrane or adsorption separation steps in order to minimize operating costs.

The method of the present invention also permits on-site separation of valuable and re-usable $C_2F_6$ from other, lower boiling point PFC compounds.

The present invention utilizes the disparate melting and boiling point temperatures of the effluent stream constituents. These temperatures are shown in Table 1 for several important compounds. For example, this table shows that all the listed substances except $N_2$ and $O_2$ will condense at $-175°$ C. ($-283°$ F.). At this temperature, pure $NF_3$, $CF_4$ or $SiH_4$ exist in the liquid phase. All the other condensable compounds exist in the solid phase.

TABLE 1

Physical Properties

| Substance | Melting Point (° C.) | Normal Boiling Point (° C.) |
|---|---|---|
| $N_2$ | −210 | −196 |
| $O_2$ | −219 | −183 |
| $NF_3$ | −207 | −129 |
| $CF_4$ | −183 | −128 |
| $SiH_4$ | −185 | −107 |
| $SiF_4$ | −87 | −95 |
| $N_2O$ | −91 | −88 |
| $CHF_3$ | −155 | −82 |
| $C_2F_6$ | −101 | −78 |
| $SF_6$ | −51 | −64 |
| HF | −83 | 19 |

Figure 1:
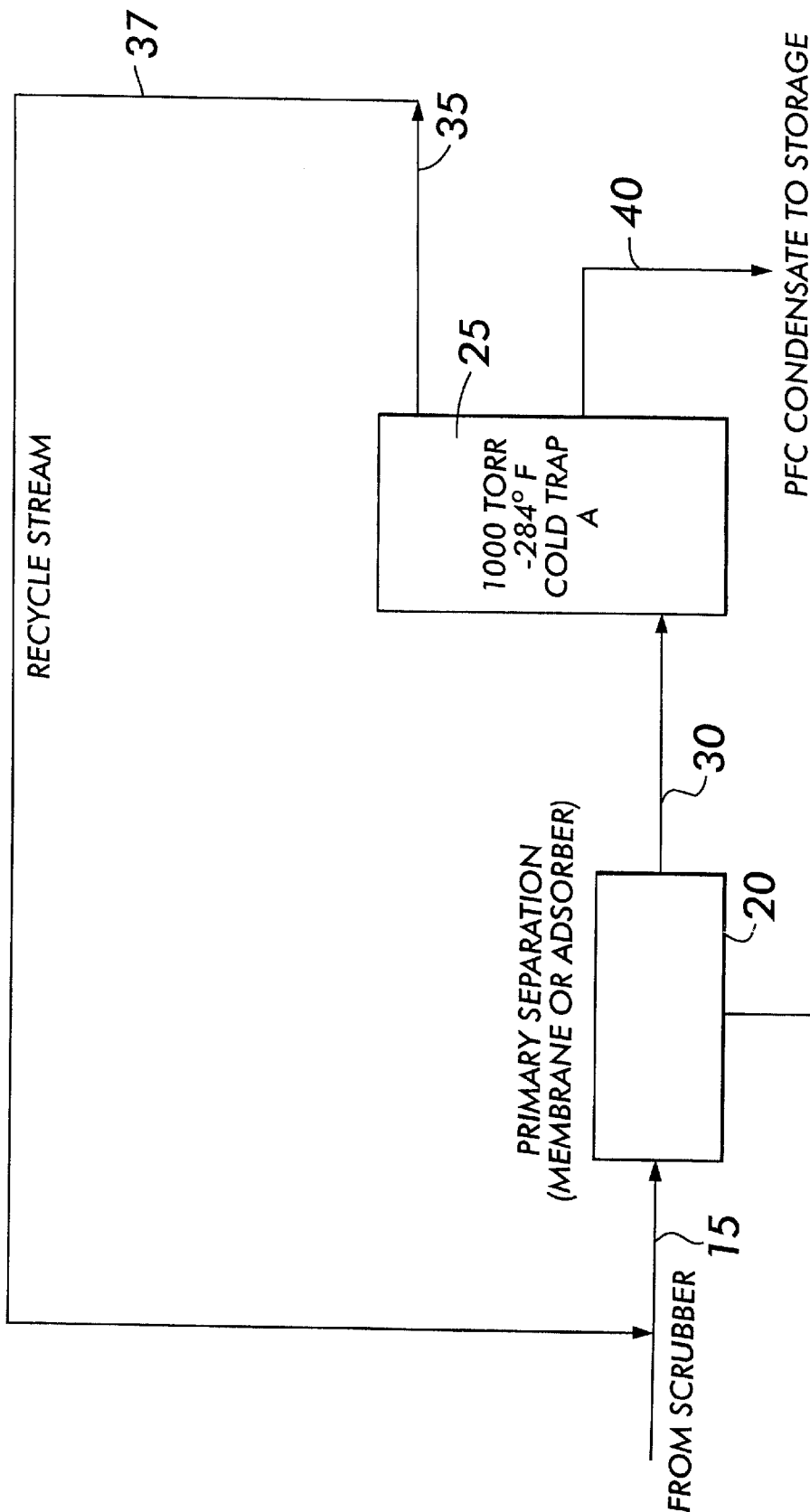
FIG. 1 is a schematic flow diagram of a first embodiment of the present invention.

Referring now to the drawings, wherein like reference numerals refer to like parts, there is shown in FIG. 1, a schematic flow diagram of a first embodiment of the present invention which is arranged for effecting the separation of perfluorocarbon compounds and reactive compounds from atmospheric gases. Not shown in FIG. 1 are the requisite ancillary compressor(s), vacuum pump(s), PFC storage vessel(s), surge vessel(s), recuperative heat exchanger(s), cryogenic cooling equipment, valving and automatic controllers needed to operate the system. As shown in FIG. 1, a gas mixture 15, e.g., a semiconductor tool effluent stream, is shown emerging from the exit end of a scrubber (not shown) having had corrosive components removed therefrom. The gas mixture 15 contains atmospheric gases, perfluorocarbon compounds and other constituents. The gas mixture 15 is next received by a primary separation device 20, such as an $N_2$-selective or PFC-selective membrane separation device. If the primary separation device 20 is a membrane separation device, then it may be a single-stage membrane separation device or may include multiple separation stages, with or without internal recycle streams. Preferably, to reduce equipment complexity and to reduce equipment and operating costs, the primary separation device 20 may be a single separation stage device. Alternatively, the primary separation device 20 may be an adsorption unit arranged for adsorbing perfluorocarbon compounds. This primary separation device 20 is used to reduce the concentration of non-condensable compounds (e.g., $N_2$) in the gas stream 15 prior to entry of the gas stream 15 into the cold trap 25 and thus, serves to reduce the cooling requirements for the downstream cold trap at 25.

The effluent 30 resulting from passage through the primary separation device 20 is enriched in perfluorocarbon compounds and is passed through the cold trap 25 which includes internal surfaces maintained at cryogenic temperatures. As shown in FIG. 1, the cold trap 25 is maintained at a predetermined temperature and pressure, e.g., a temperature of approximately $-173°$ C. and a pressure of approximately 1000 torr. Cooling of the mixture stream 30 occurs within the cold trap 25. Perfluorocarbon compounds contained within the stream 30 are condensed and separated from the stream 30 and are retained in the cold trap 25 either in solid or liquid phase. The remaining non-condensable gas stream 35, which includes atmospheric gases, continues through and exits the cold trap 25 and is recycled through a conduit 37 to the inlet of the primary separation unit 20 where it is mixed with gases exiting the scrubber as shown in FIG. 1. Alternatively, the non-condensable atmospheric gases 35 may be vented to the outside atmosphere. Thereafter, the condensed perfluorocarbon compounds 40 retained within the cold trap 25 may be removed therefrom and sent directly to a storage container (not shown) for re-use or further purification.

Figure 2:
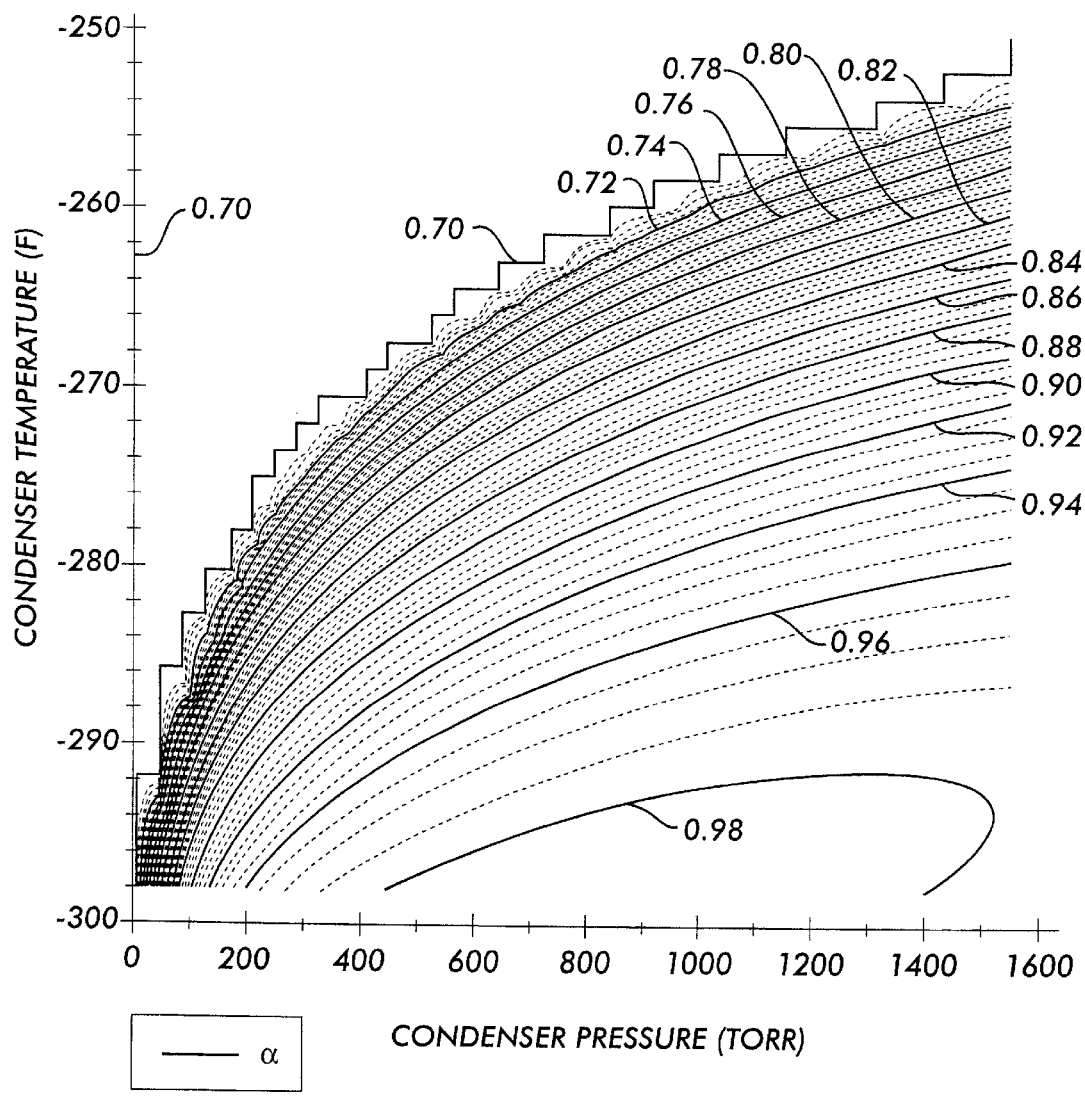
FIG. 2 is a graph illustrating the separation efficiency of the cold trap process of the present invention under various operating conditions.

Referring now to FIG. 2, thermodynamic calculations were performed to estimate the separation efficiency of the cold trapping process described above under various operating conditions. For example, an incoming perfluorocarbon stream containing 90% $N_2$, 7% $C_2F_6$, 2.8% $CF_4$ and 0.2% $NF_3$ by mole, was used in the calculations. $C_2F_6$, $CF_4$ and $NF_3$, in toto, are defined as the perfluorocarbon compounds. This gas mixture approximates the composition of a typical semiconductor tool effluent stream after it has emerged from the exit end of a single-stage membrane. The stream enters the cold trap 25 at a pressure in the range of between 10 torr to 1551 torr and was cooled in the cold trap 25 to a temperature ranging from $-157°$ C. to $-183°$ C. As shown in FIG. 1, the cold trap 25 has a single incoming stream or feed stream 30 and two outgoing streams. One outgoing stream 35 is the non-condensable atmospheric gases that continue through the cold trap and are recycled to the inlet of the primary separation unit 20 or are vented to the atmosphere. The other outgoing stream 40 is condensate removed from the cold trap and transferred to a storage unit.

Referring again to FIG. 2, the molar flow rate, X, of the $N_2$ and of the perfluorocarbons was calculated for the feed, condensate and uncondensed vapor streams of the cold trap. This calculation was performed for various operating temperatures and pressures. Next, a perfluorocarbon separation factor, α, was defined as follows:

$$\alpha = [X_{condensed\ PFCs}/X_{feed\ PFCs}][X_{vent\ N2}/X_{feed\ N2}]$$

The separation factor, α, can have values in the range 0 to 1. When the molar flow rate of condensed PFCs approaches 0 or the molar flow rate of $N_2$ in the uncondensed vent stream approaches 0, the separation factor α approaches 0. A separation factor of 0 indicates no separation of perfluorocarbon compounds from the $N_2$ and represents a low separation efficiency for the cold trap.

Conversely, when the molar flow rate of condensed perfluorocarbon compounds approaches the molar flow rate of perfluorocarbon compounds in the feed, and the molar flow rate of $N_2$ in the uncondensed vent stream approaches the molar flow rate of $N_2$ in the feed, the separation factor, α, approaches 1. A separation factor of 1 indicates perfect separation of the perfluorocarbon compounds from the $N_2$ and represents a high separation efficiency for the cold trap. A separation factor of 0.9 or greater is considered acceptable for effective recovery of perfluorocarbon compounds from semiconductor tool effluent streams.

A graph of the calculation results in the form of a contour plot is shown in FIG. 2. Different contour plots result from different feed stream compositions. However, FIG. 2 shows that separation factors greater than 0.9 can be achieved over a range of cold trap operating pressures near atmospheric pressure, i.e., 760 torr, without expensive gas compression. These high separation factors can be achieved at cold trap operating temperatures lower than approximately $-171°$ C.

Referring again to FIG. 1, in accordance with the present invention, the cold trap 25 typically operates at temperatures in the range −100° C. to −196° C. and pressures in the range 1 torr to 2300 torr. However, experiments have shown that a cold trap operated at a preferred temperature of −176° C. and pressure of 1000 torr can recover 99% of the perfluorocarbon compounds from its feed stream. All cold trap operating conditions listed herein are typical. Optimal operating conditions may differ from these values.

The perfluorocarbon enriched condensate 40 contains approximately 5% $N_2$. The perfluorocarbon enriched condensate 40 collects on the walls of the cold trap 25. To remove the condensate and send it to storage, the cold trap 25 is first isolated from the process flow. Once isolated, the cold trap 25 is re-warmed which causes the condensate to vaporize to a gas within the cold trap 25. Once in gaseous form, the condensate 40 may be recovered. Prior to this re-warming step, the vapor space within the cold trap 25 may be briefly evacuated to 100 torr or less to remove the $N_2$-enriched non-condensed vapor from the space within the cold trap 25. Re-warming of the cold trap 25 can then be accomplished in several ways, e.g., by stopping the flow of coolant to the cold trap 25 or by adding heat to the cold trap 25. Heat may be added to the cold trap 25 through various well known means, for example, by thermal contact with a warming medium, such as warm gaseous $N_2$, or through electrical heating of the vessel. The vaporized condensate is then removed from the cold trap 25.

Figure 3:
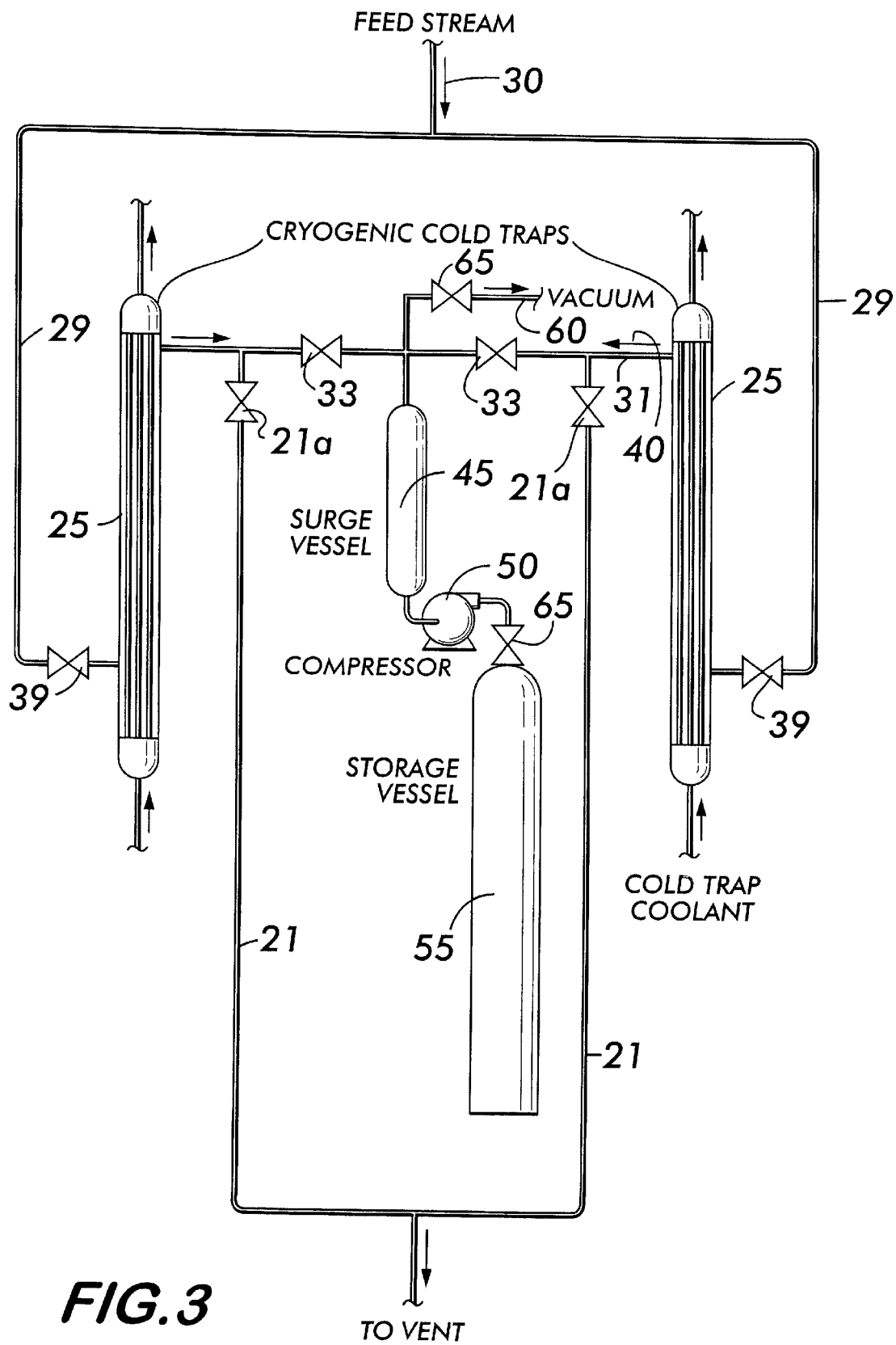
FIG. 3 is a schematic flow diagram of the present invention illustrating two cold traps operating in parallel.

Referring now to FIG. 3, the feed stream 30 enters conduit 29 and passes through valves 39 prior to entering the cold traps 25. The non-condensed vapor from the cold trap is vented to the atmosphere through conduit 21 and associated valves 21a. After condensation within the cold trap 25, the perfluorocarbon compounds are captured for storage by heating the condensate and flowing the re-vaporized condensate 40 from the cold trap 25, through a conduit 31 and valve 33, through a suitable surge vessel 45 and compressor 50, and into a suitable pressurized storage vessel 55. The vacuum line 60 and associated valve 65 are included to remove the residual N2-enriched vapor from within the cold trap 25 as described above. The uncondensed vapor stream contains 99.92% $N_2$.

The cold trap 25 is cooled using thermal contact with a coolant medium. The coolant medium may consist of cold gaseous $N_2$ produced from liquid $N_2$ (LIN), or other cryogens. Cooling can also be provided by a closed cycle cryogenic refrigeration system in thermal contact with a gaseous $N_2$ or other gaseous or liquid coolant streams. This variation eliminates the need for a continuous supply of LIN coolant.

Figure 4:
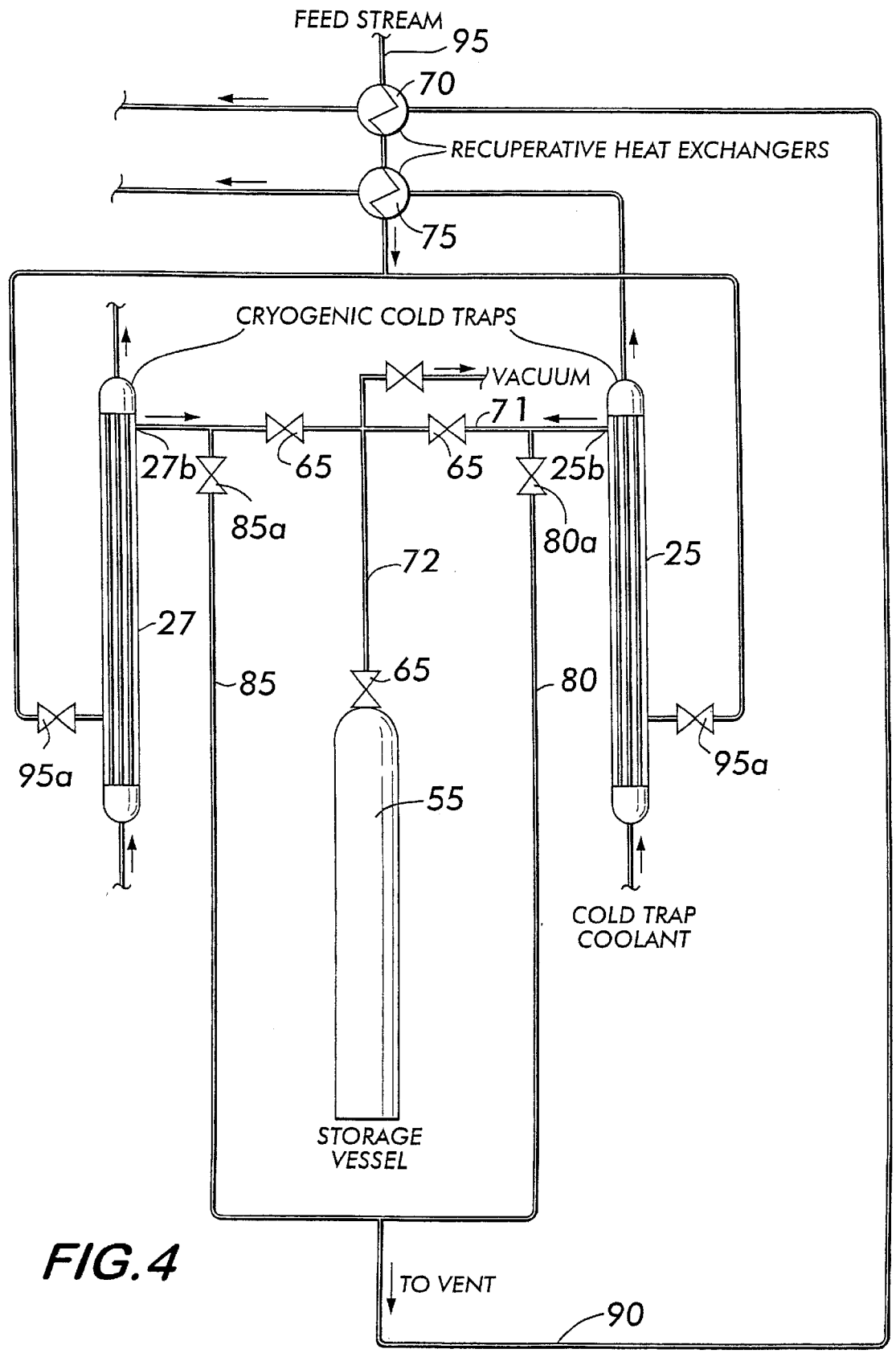
FIG. 4 is a schematic flow diagram of an alternative embodiment of the present invention illustrating two cold traps operating in parallel and recuperative heat exchangers being employed.

Referring now to FIG. 4, in an alternative embodiment of the present invention, the storage cylinder 55 can be filled without the necessity of the surge vessel 45 and the compressor 50 (shown and discussed in FIG. 3) by using isochoric (constant volume) heating of the condensate within the cold trap 25. As mentioned previously, the elimination of components, especially a compressor, may be desirable for several reasons. Compressors tend to have a high equipment and operating cost due to maintenance and power consumption. Compressors also require substantial on-site space and noise abatement equipment. Compressors also tend to contaminate the reusable perfluorocarbon compounds by introducing particles and molecular contaminants into the process flow. Such contamination requires clean-up and purification after perfluorocarbon recovery. Additional compression equipment also increases downtime and reduces the overall reliability of the perfluorocarbon recovery process.

In the embodiment shown in FIG. 4, the cold trap 25 is Connected directly to the perfluorocarbon storage cylinder 55 through a plurality of valves 65 and piping 71. and 72. No surge vessel 45 or compressor 50 is required under this embodiment. The pressure created by heating the condensate located within the cold trap 25 provides a motive force used to transfill the storage cylinder 55 with the vaporized perfluorocarbon condensate. This transfer method works because typical perfluorocarbon condensate mixtures can be completely vaporized at practical re-warm temperatures. For example, a condensate perfluorocarbon mixture containing 70% $C_2F_6$, 24% $CF_4$ and 6% $N_2$ has a cricondentherm (maximum temperature on the vaporfiquld phase envelope) of approximately 9° C. When the mixture converts to a homogeneous vapor phase, It can be effectively transferred through gas lines to the storage cylinder 55. Calculations show that isochoric heating can be easily used to fill storage cylinders 55 to a pressure of approximately 52,500 torr. With compressors, it is possible to fill the storage cylinder 55 to higher pressures, e-g., 104,200 torr.

After the perfluorocarbon condensate is removed from the cold trap 25, the flow of the coolant medium is restarted and the cold trap 25 is again cooled for operation. As shown in FIGS. 3 and 4, two cold trap vessels 25 and 27 are connected in parallel. The cold trap 25 continues the condensation process while the other cold trap 27 is being warmed for removal of condensate.

In order to reduce utilities and coolant requirements, the feed stream entering through conduit 95 and associated valves 95a may be pre-cooled prior to entering the cold traps 25 and 27 using one or more recuperative heat exchangers 70 and 75. As shown in FIG. 4, the recuperative heat exchanger 70 utilizes streams of cold non-condensed gas that exit the cold traps during the cooling step. In particular, a stream of cold non-condensed gas exits cold trap 25 at exit port 25b and another stream of cold non-condensed gas exits the cold trap 27 at exit port 27b. These non-condensed gas streams travel through valves 80a and 85a located on conduits 80 and 85 which converge at a conduit 90 which returns the cold non-condensed gas streams to the recuperative heat exchanger 70 which can thus provide pre-cooling of the feed stream entering through conduit 95 prior to entry into the cold traps 25 and 27. The recuperative heat exchanger 75 receives coolant that has already been circulated through the cold trap 25. Although coolant that has already been circulated through the cold trap 25 has drawn out some heat from the cold trap 25, the coolant is still relatively cold. For example, instead of being at −129° C., the coolant may be at −73° C. and this coolant may still be useable for pre-cooling the feed stream prior to entry into the cold trap 25. In this manner, recuperative heat exchanger 75 can provide additional pre-cooling of the feed stream entering through conduit 95 prior to entry into the cold traps 25 and 27. Thus, much of the heat can be removed from the feed stream by the recuperative heat exchanger 75 prior to the feed stream reaching the cold trap 25. In this manner, the cold trap 25 will not have to work as hard to cool the feed stream.

Figure 5A:
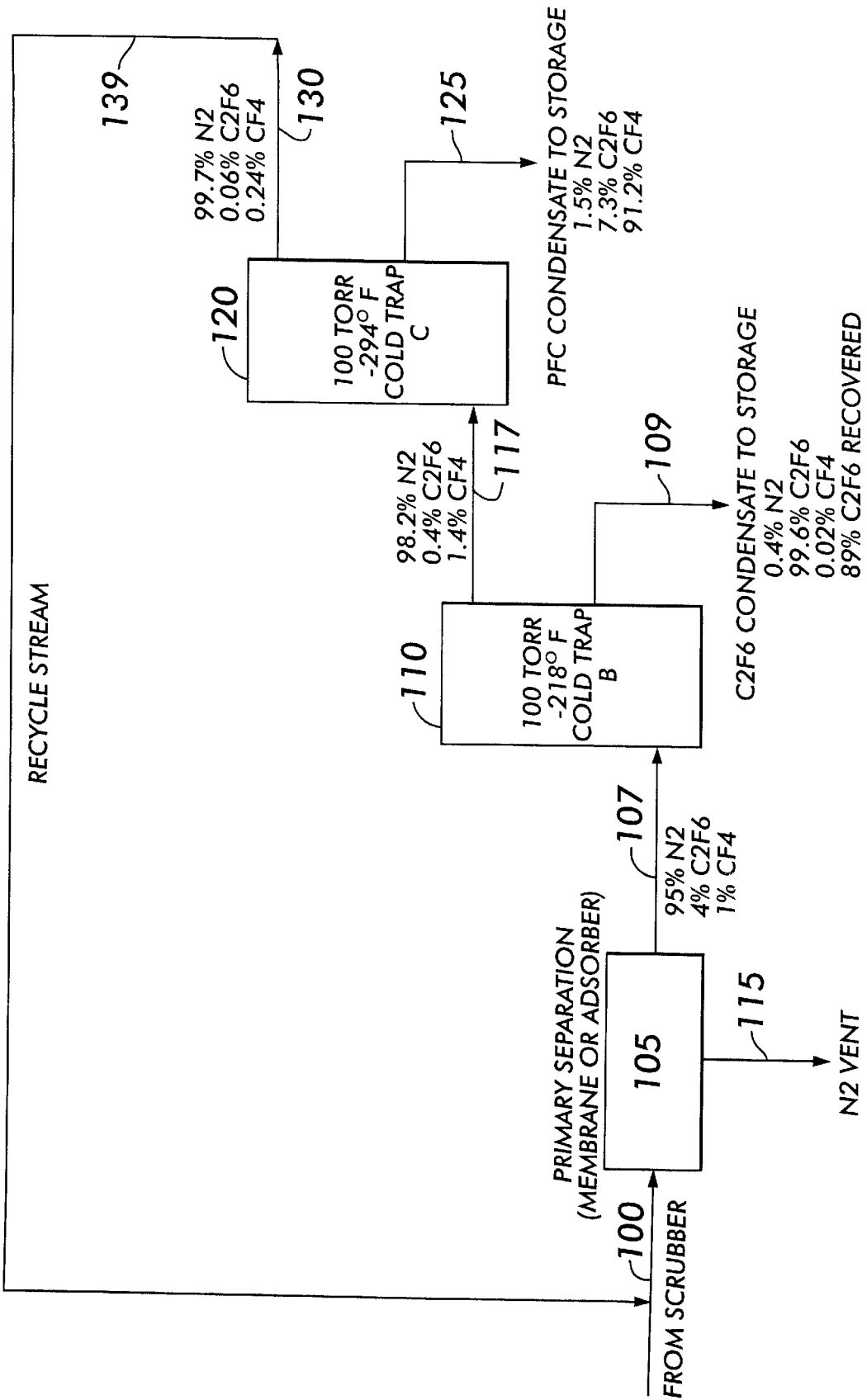
FIG. 5a is a schematic flow diagram of a variation of the first embodiment of the present invention.

A variation of the first embodiment of the present invention is shown in FIG. 5a. A gas mixture 100 is received by a primary separation device 105 from two sources, i.e., a scrubber (not shown), and from an influent recycle stream 139. As with the first embodiment, the primary separation device 105 may be an $N_2$-selective or PFC-selective membrane separation device. Also, the primary separation device 105 may be a single-stage device or may include multiple separation stages, with or without internal recycle streams. Alternatively, the primary separation device 105 may be an adsorber. As shown in FIG. 5a, an enriched gas stream 107 exiting the primary separation device 105 contains 95% $N_2$, 4% $C_2F_6$ and 1% $CF_4$ and enters Cold Trap B 110. A gas stream 115 comprising $N_2$ and other atmospheric gases is vented to the atmosphere.

Under this variation, cold trap 110 is maintained at a temperature of −139° C. and at a pressure of 100 torr. The cold trap 110 receives the enriched gas stream 107 and recovers perfluorocarbon compounds therefrom which are condensed and sent to storage at 109. Experiment has shown that this cold trap 110 recovers 89% of the $C_2F_6$ contained in the enriched gas stream 107 at a purity of approximately 99.6%. This purity may be acceptable for semiconductor applications mentioned above, or can be mixed with semiconductor grade (99.999% pure) $C_2F_6$ on-site to provide increased purity. Therefore, no further purification of this mixture may be required. The non-condensed vapor stream 117 is sent to a second cold trap 120 (Cold Trap C) which operates at a predetermined temperature and pressure, e.g., a temperature of approximately −181° C. and a pressure of approximately 100 torr. Cold trap 120 effectively removes the remaining perfluorocarbons by condensation. Experiments have shown that this cold trap 120 can produce a condensate 125 containing 1.5% $N_2$. This condensate 125 must be further purified for re-use. The non-condensable atmospheric gases 130 flowing from the cold trap 120 contain 99.7% $N_2$ which, optionally, may be recycled through conduit 139 to the inlet of the primary separation device 105 for further recovery of perfluorocarbons, or directly vented.

Figure 5B:
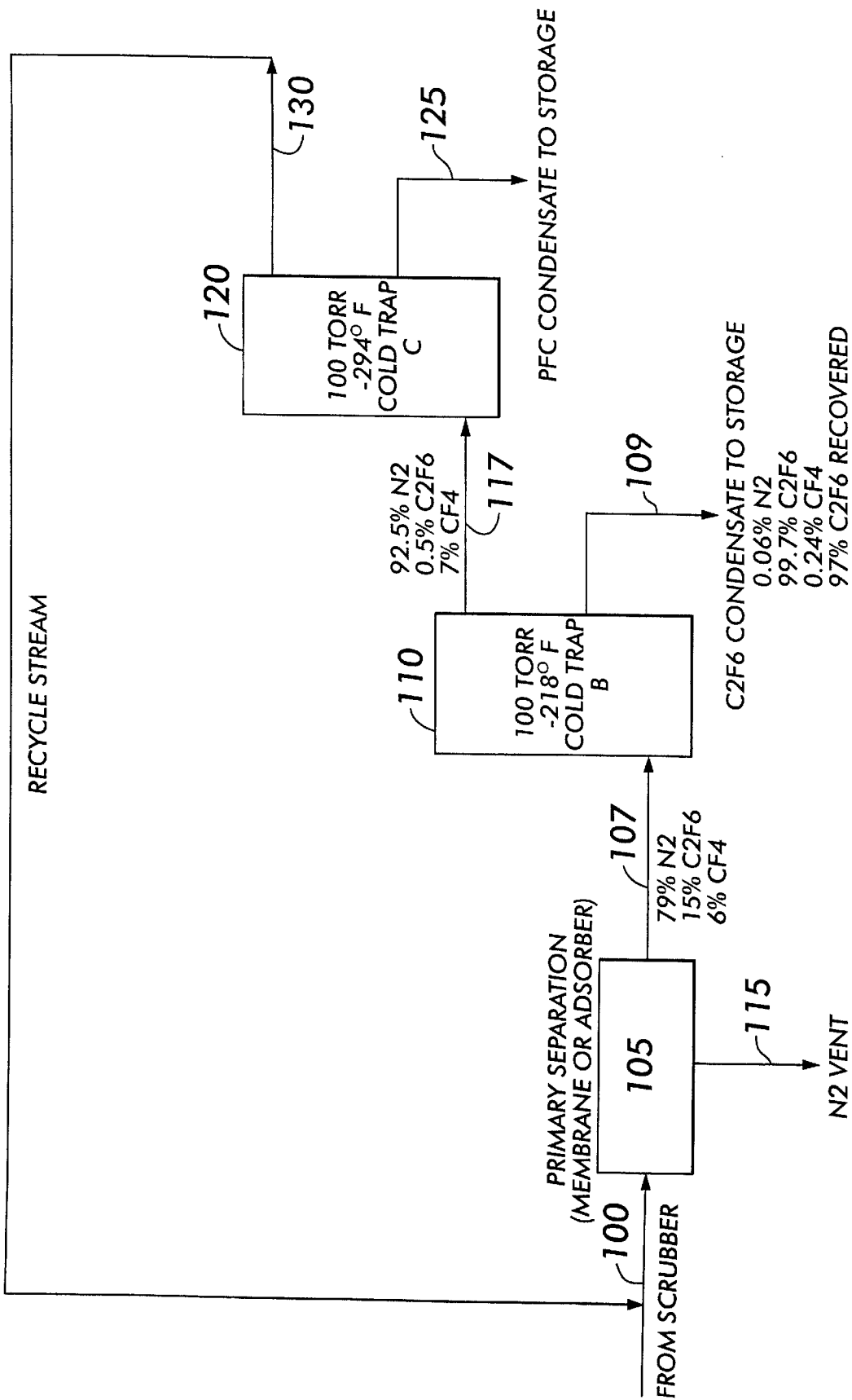

Referring now to FIG. 5b, the variation of the first embodiment described above in FIG. 5a was exposed to alternate feed conditions. Under these alternate feed conditions, an upstream membrane separation unit can produce a stream 107 enriched in perfluorocarbon compounds containing approximately 79% $N_2$ and other atmospheric gases. The first cold trap 110 receives this influent stream 107. Experiments have shown that under this alternate feed condition, the first cold trap 110 (Cold Trap B) can recover 97% of $C_2F_6$ compound at a purity of 99.7% along with other condensates. This purity may be acceptable for semiconductor applications or can be mixed with semiconductor grade (99.999% pure) $C_2F_6$ on-site to provide increased purity. Therefore, no further purification of this mixture may be required. The non-condensed vapor stream 117 contains 92.5% $N_2$. This vapor stream 117 is sent to the second cold trap 120 (Cold Trap C) for removal of the remaining perfluorocarbons which are condensed out, re-vaporized, and sent to storage 125.

Figure 6:
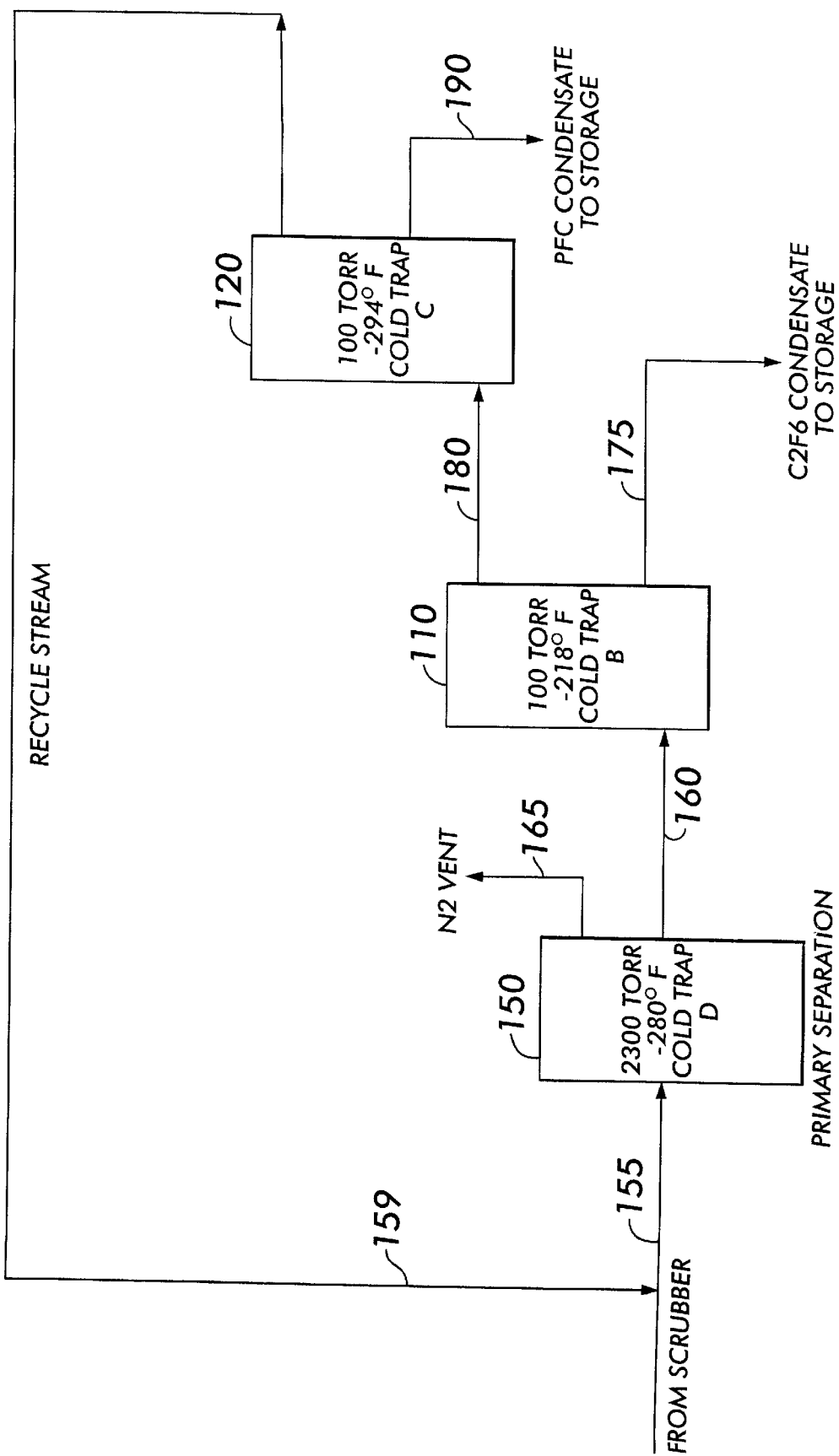
FIG. 6 is a schematic flow diagram of another variation of the first embodiment of the present invention.

Another variation of the first embodiment of the present invention is illustrated in FIG. 6. In this variation, rather than having a membrane separation unit or an adsorber as the primary separation unit as described under previous variations, a cold trap 150 (Cold Trap D) is utilized. The cold trap 150 is cooled and maintained at a predetermined temperature and pressure, e.g., a temperature of approximately −173° C. and a pressure of approximately 2300 torr The cold trap 150 receives an influent stream 155 from a scrubber (not shown) and an influent recycle stream 159. Together, these two influent streams contain 99% atmospheric gases. Experiments have shown that this cold trap 150 can produce a condensate stream 160 containing 2% $N_2$ and a non-condensed stream 165 containing 99.97% $N_2$. 98% of the perfluorocarbons are condensed by the cold trap 150. This separation efficiency surpasses that of most single stage membrane separation units discussed above. The re-vaporized condensate 160 enriched in perfluorocarbons then flows to a second cold trap 110 (Cold Trap B) for recovery of $C_2F_6$. The re-vaporized stream of $C_2F_6$ condensate 175 is sent to a storage vessel (not shown). The non-condensed stream 180 exiting the second cold trap 110 flows to a third cold trap 120 (Cold Trap C) for recovery of the remaining perfluorocarbons 190 which are sent to a storage vessel (not shown). The non-condensed stream 159 is recycled or vented to the atmosphere.

Figure 7:
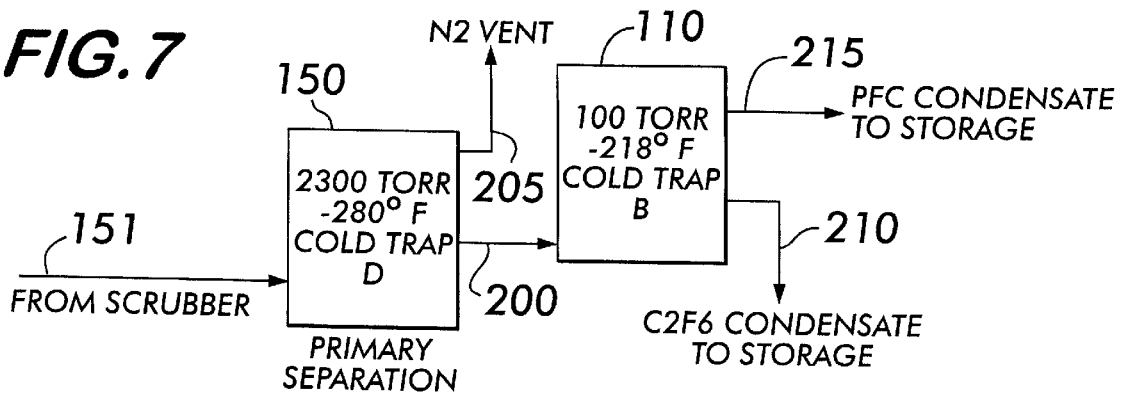
FIG. 7 is a schematic flow diagram of another variation of the first embodiment of the present invention.

Another variation of the first embodiment of the present invention is shown in FIG. 7 wherein an influent stream 151 is received from a scrubber (not shown). In this variation, the cold trap 150 (Cold Trap D) is again used to effect primary separation of a perfluorocarbon compound stream 200 from a stream 205 of $N_2$ and other atmospheric gases which are vented to the atmosphere. The second cold trap 110 (Cold Trap B) is again used to receive the influent stream 200 of re-vaporized perfluorocarbon compounds and effect removal of $C_2F_6$ from the stream 200. A re-vaporized stream 210 of condensed $C_2F_6$ is sent to a storage vessel (not shown) while the stream 215 of remaining perfluorocarbon compounds and atmospheric gases are sent to a separate storage vessel (not shown). However, under this variation, no Cold Trap C is included for further separation of perfluorocarbon compounds from atmospheric gases in the stream 215 as was discussed in connection with the variation shown in FIG. 6. The uncondensed vapor stream 215 from Cold Trap B is sent directly to storage for further purification or disposal. This variation of the present invention may be utilized when the $N_2$ content in the uncondensed stream 215 is considered low enough to permit immediate storage without further separation.

Figure 8:
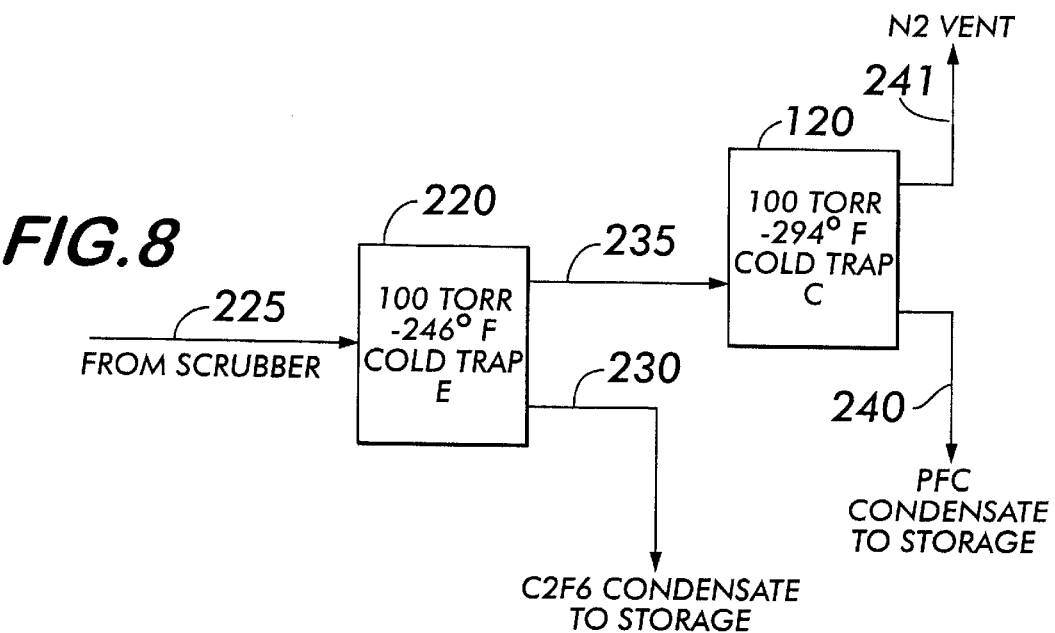
FIG. 8 is a schematic flow diagram of another variation of the first embodiment of the present invention.

Another variation of the first embodiment of the present invention is shown in FIG. 8. In this varation, Cold Trap E (shown at 220) operates at a predetermined temperature and pressure, e.g., approximately −154° C. and approximately 100 torr. Cold Trap E receives an influent gas mixture 225 from a scrubber (not shown) containing approximately 99% atmospheric gases and removes a vaporized stream 230 of $C_2F_6$ condensate which is sent to a storage vessel (not shown). Experiments have shown that this cold trap 220 can recover 99.5% of the $C_2F_6$ at a purity of 99.7%. This purity may be acceptable for semiconductor applications, or can be mixed with semiconductor grade (99.999% pure) $C_2F_6$ on-site to provide increased purity. Therefore, no further purification of this mixture is required. The non-condensed vapor stream 235 contains approximately 99.7% $N_2$ This vapor stream 235 is sent to Cold Trap C (shown at 120) for removal of remaining perfluorocarbon compounds. The perfluorocarbon compound enriched condensate stream 240 is sent directly to storage for further purification or disposal while the non-condensed gas mixture containing primarily $N_2$ may be vented 241 to the atmosphere.

Note that under the variation shown in FIG. 7 and the variation shown in FIG. 8, each effects separation of $C_2F_6$ and remaining perfluorocarbons using only two cold traps. However, under the FIG. 7 variation, substantially less coolant is required since the major portion of the non-condensable gas, i.e., $N_2$, flows only through the first cold trap 150, Cold Trap D, while under the variation shown in FIG. 8, non-condensable gases are required to flow through both cold traps (220, 120), i.e., Cold Trap E and Cold Trap C.

Figure 9:
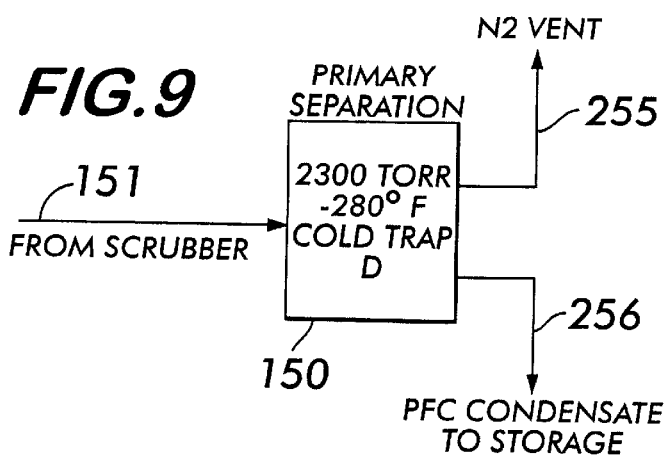
FIG. 9 is a schematic flow diagram of another variation of the first embodiment of the present invention.
Figure 10A:
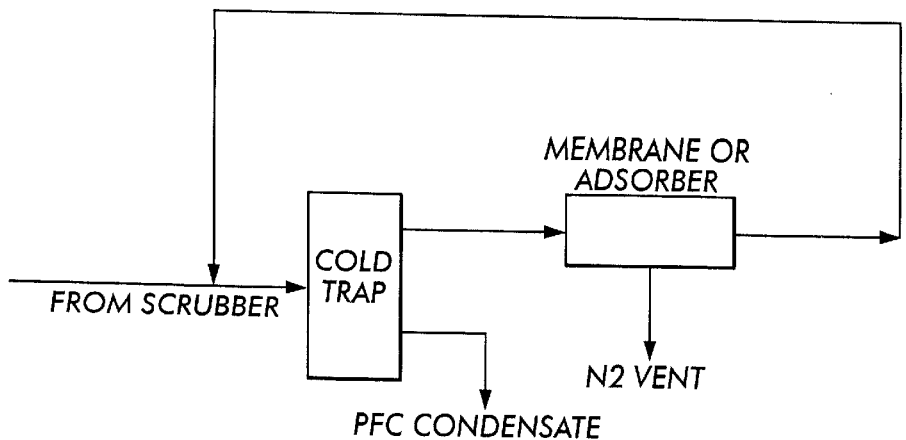
FIG. 10a is a schematic flow diagram of another variation of the first embodiment of the present invention.
Figure 10B:
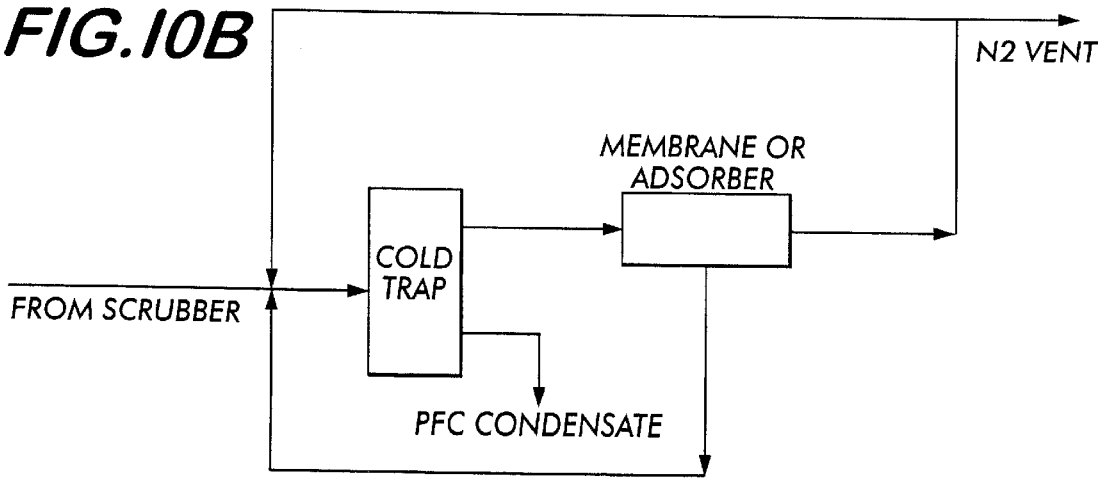
FIG. 10b is a schematic flow diagram of another variation of the first embodiment of the present invention.
Figure 10C:
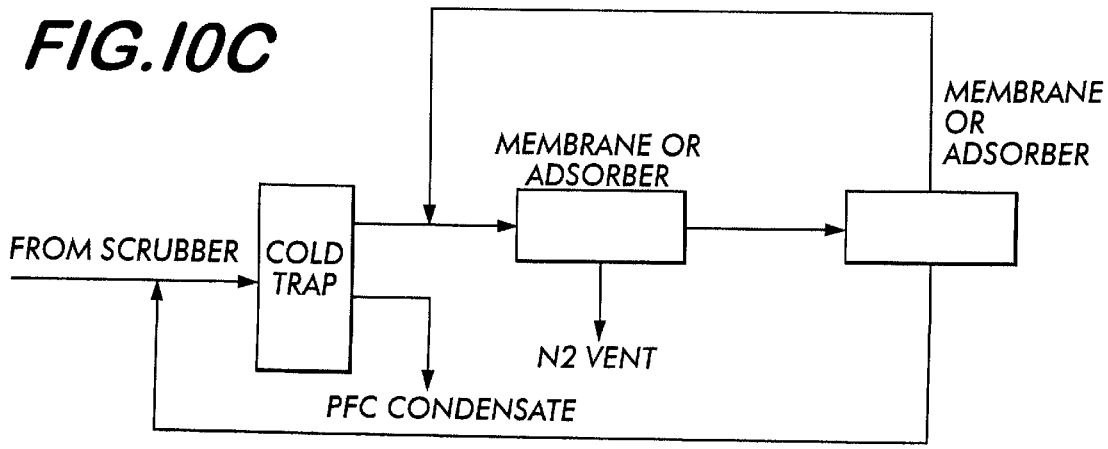
FIG. 10c is a schematic flow diagram of another variation of the first embodiment of the present invention.
Figure 11A:
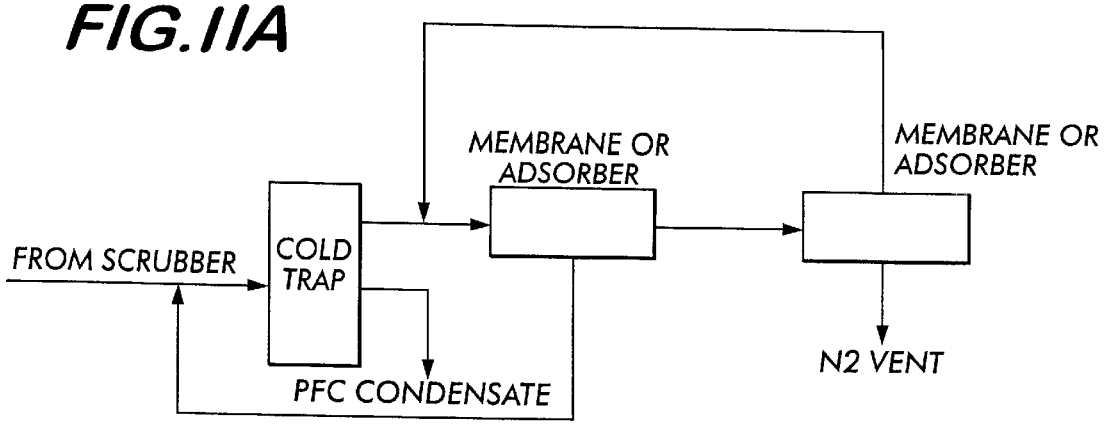
FIG. 11a is a schematic flow diagram of another variation of the first embodiment of the present invention.
Figure 11B:
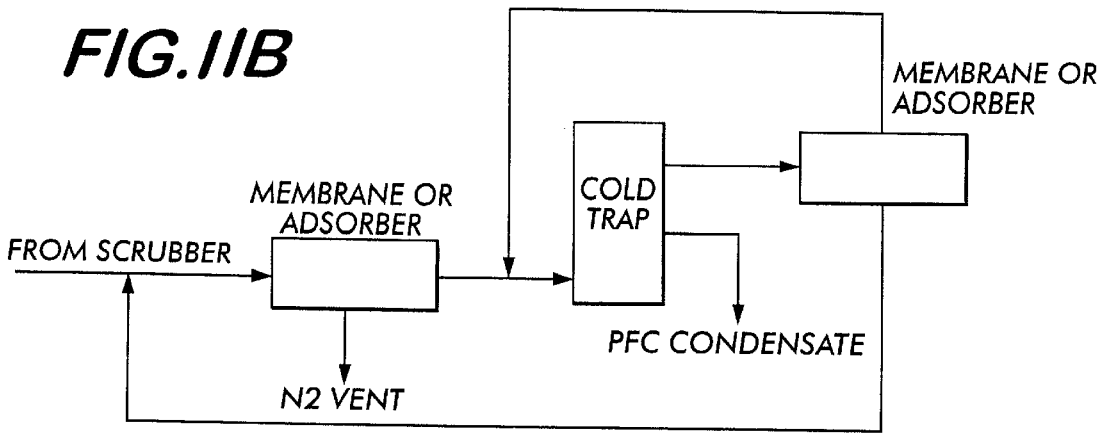
FIG. 11b is a schematic flow diagram of another variation of the first embodiment of the present invention.
Figure 11C:
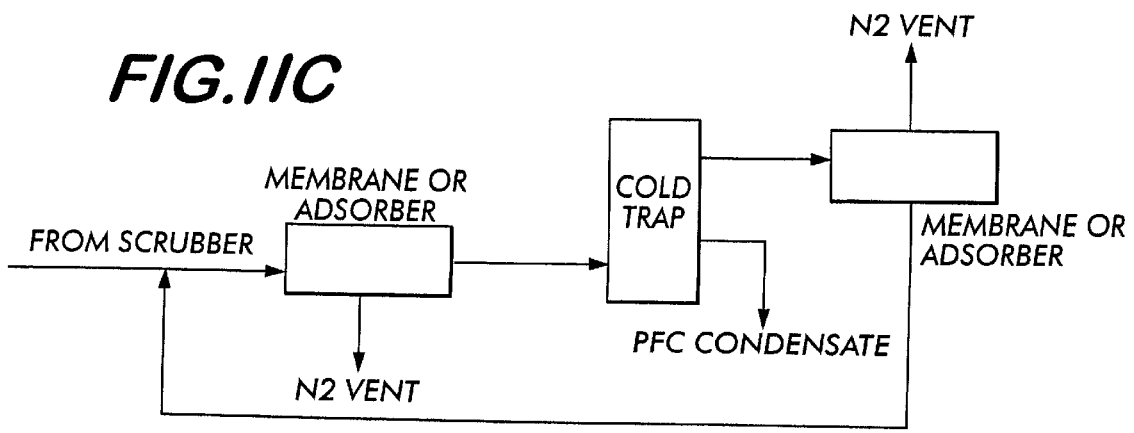
FIG. 11c is a schematic flow diagram of another variation of the first embodiment of the present invention.
Figure 12A:
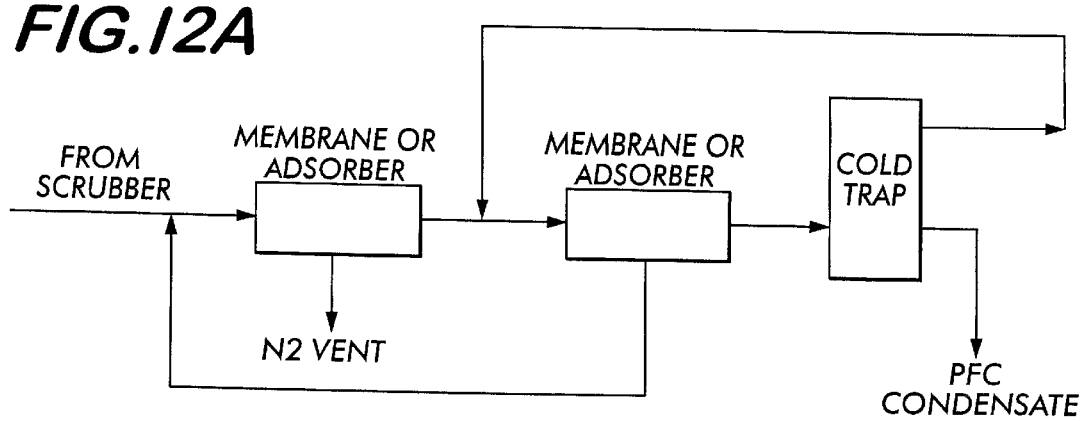
FIG. 12a is a schematic flow diagram of another variation of the first embodiment of the present invention.
Figure 12B:
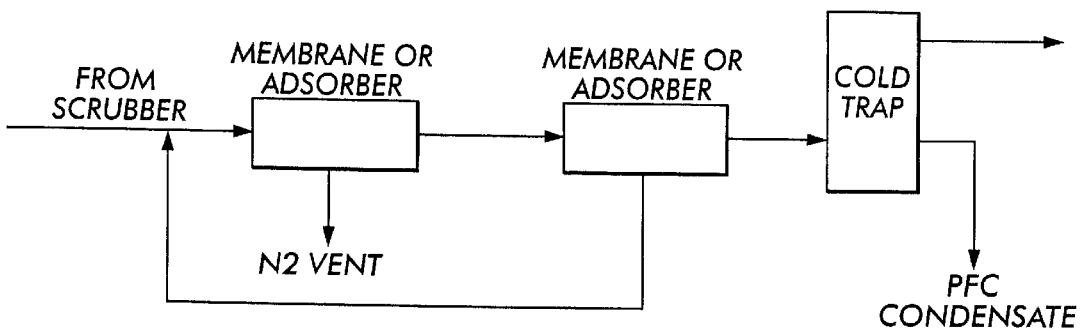
FIG. 12b is a schematic flow diagram of another variation of the first embodiment of the present invention.
Figure 12C:
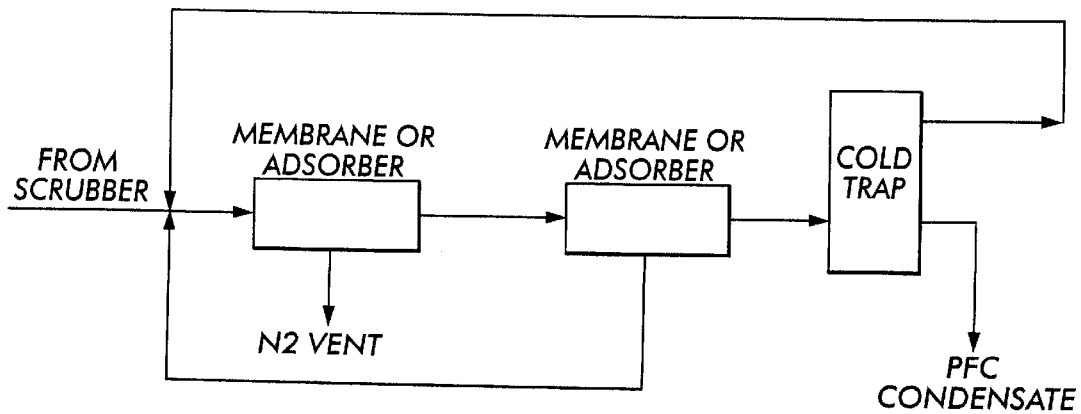
FIG. 12c is a schematic flow diagram of another variation of the first embodiment of the present invention.
Figure 13A:
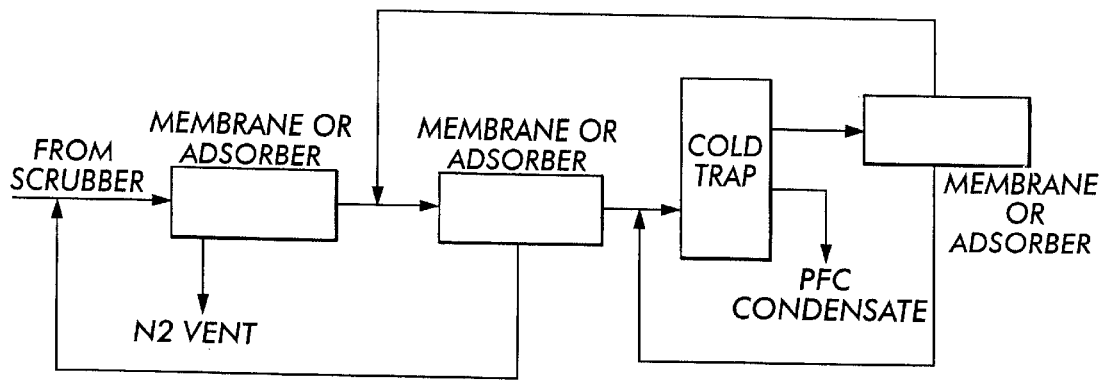
FIG. 13a is a schematic flow diagram of another variation of the first embodiment of the present invention.
Figure 13B:
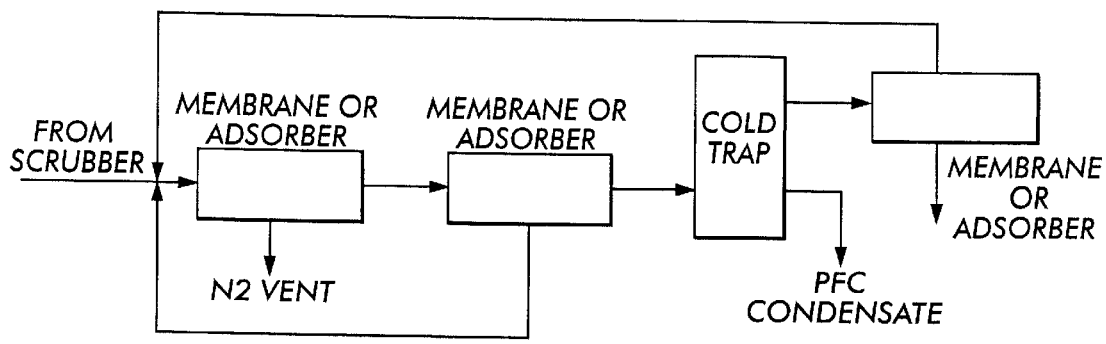
FIG. 13b is a schematic flow diagram of another variation of the first embodiment of the present invention.
Figure 13C:
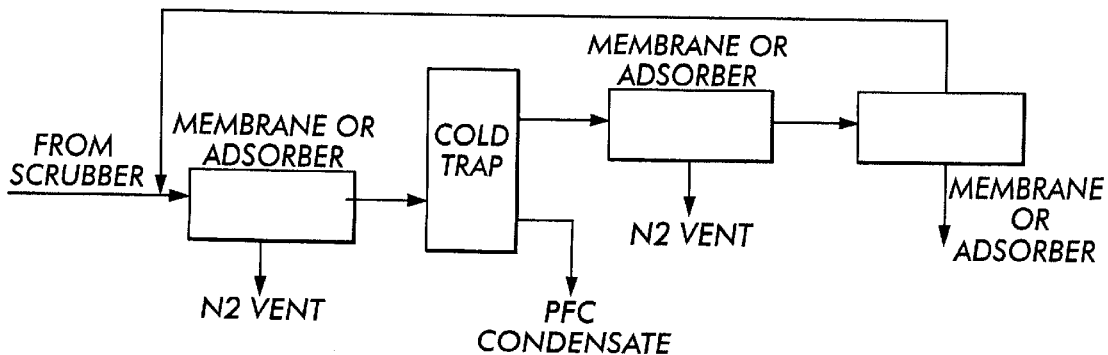
FIG. 13c is a schematic flow diagram of another variation of the first embodiment of the present invention.
Figure 14:
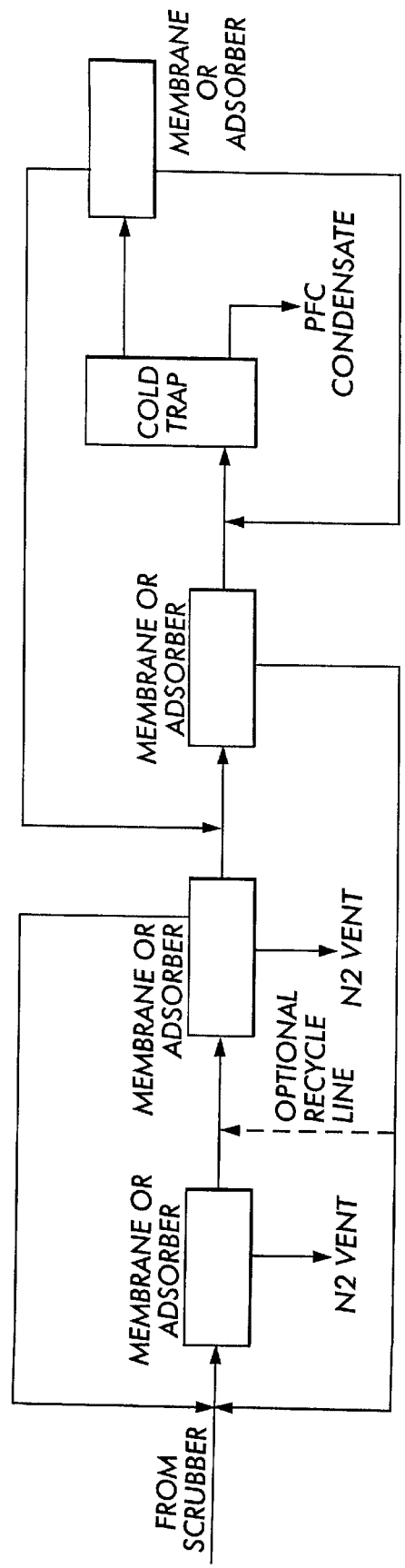
FIG. 14 is a schematic flow diagram of another variation of the first embodiment of the present invention.

Another variation of the first embodiment of the present invention is shown in FIG. 9 wherein an influent stream 151 is received by a cold trap 150, Cold Trap D. Under this variation, a single cold trap 150, Cold Trap D, is used to effect primary separation of all perfluorocarbon compounds. A vapor stream 255 depleted of perfluorocarbon compounds is vented to the atmosphere while the perfluorocarbon enriched condensate is re-vaporized to a gas stream 256 and sent directly to a storage vessel (not shown) for further purification or disposal. This variation requires a minimal amount of equipment and complexity to effect recovery of perfluorocarbons.

Additional variations of the first embodiment are shown in FIGS. 10 through 14. In each case, a cryogenic cold trap is combined with one or more separation devices, such as $N_2$-selective or PFC-selective membrane separation stages and/or PFC adsorption units. Each separation device may consist of multiple separation stages with or without internal recycle streams. More preferably, in order to reduce equipment complexity and overall costs, the separation device may consist of a single separation stage. Not shown in the figures are the ancillary compressor(s), vacuum pump(s), PFC storage vessel(s) and surge vessel(s), recuperative heat exchanger(s), cryogenic cooling equipment, valving and automatic controllers needed to operate the systems.

In several of the variations of the first embodiment of the present invention, at least one of the cold traps is operated at sub-atmospheric pressure. For example, in the variations shown in FIGS. 5a and 5b, both cold traps 110 and 120 (Cold Traps B and C) are operated at a preferred pressure of 100 torr. In these variations, pressure reduction within the cold traps 110 and 120 is accomplished by use of a pressure let-down device (not shown) located upstream from each of the cold traps and a continuously operated vacuum pump (not shown) located in the non-condensed vapor line downstream from each of the cold traps 110 and 120. Each vacuum pump (not shown) must have sufficient capacity to flow all the non-condensed vapor exiting each of the cold traps 110 and 120 at a required pressure in order to maintain sub-atmospheric pressure within each of the cold traps 110 and 120. Such a vacuum pump frequently requires substantial equipment and operating costs.

The costs associated with such vacuum pumps may be substantially reduced by staging the cooling and pumping processes. This staging also permits the two cold traps 110 and 120 to be combined into a single cold trap, thus, significantly reducing equipment and operating costs associated with the cold traps.

Figure 15:
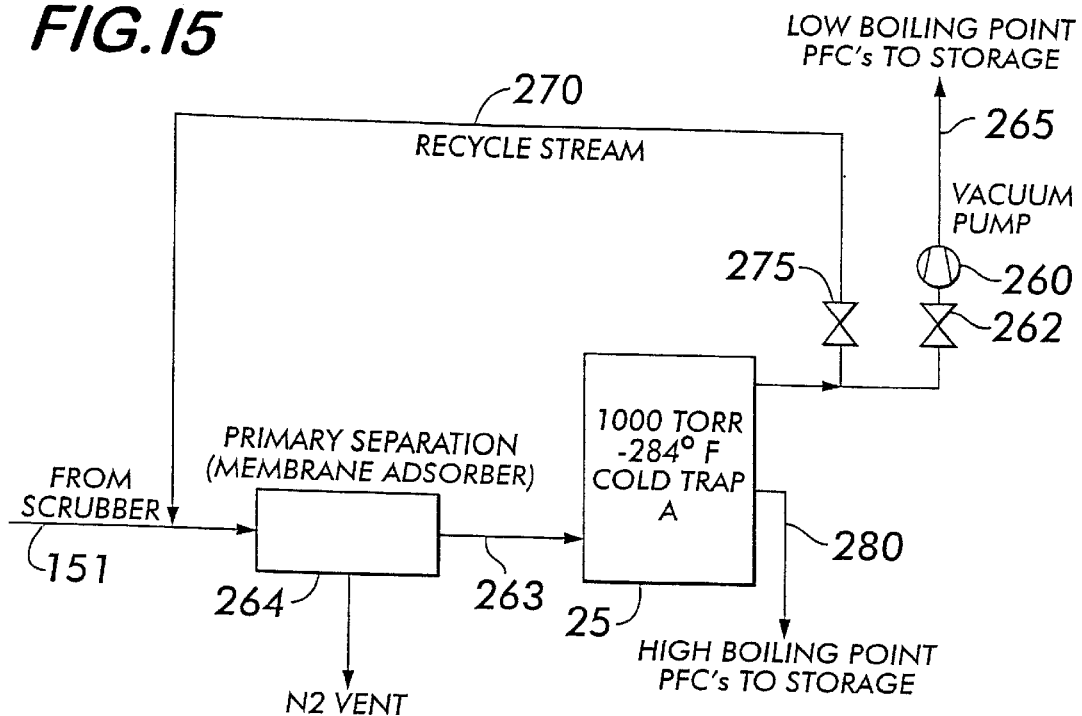
FIG. 15 is a schematic flow diagram of a second embodiment of the present invention; and, FIG. 16 is a schematic flow diagram of a third embodiment of the present invention.

For example, the staging discussed herein can be incorporated into the variation of the first embodiment of the present invention shown in FIGS. 5a and 5b to eliminate the second cold trap 120. A second embodiment employing this approach is shown in FIG. 15. In this second embodiment, an influent stream 151 is received from a scrubber (not shown) by a cold trap 25 (Cold Trap A) which operates at a temperature of −176° C. and at a pressure of 1000 torr. A vacuum pump 260 is isolated from the cold trap 25 during the first process step by means of valve 262. An effluent 263 depleted of $N_2$ exits a primary separation device 264 and enters the cold trap 25 wherein perfluorocarbon-enriched condensate is collected in the cold trap 25 and wherein non-condensable $N_2$-enriched vapor flows through a recycle line 270. Alternatively, the $N_2$-enriched vapor could be vented to the atmosphere. After the perfluorocarbon-enriched condensate is collected in the cold trap, the recycle line 270 is isolated from the cold trap 25 by means of a valve 275.

During the second process step, the vacuum pump 260 is energized and an associated valve 262 is opened to reduce the pressure within the cold trap 25. This pressure reduction within the cold trap 25 tends to remove the more volatile (low boiling point) condensed perfluorocarbons from the condensate through conduit 265, leaving the condensate enriched in $C_2F_6$. The volatile perfluorocarbons removed from the cold trap 25 by the vacuum pump 260 are sent directly to storage for further purification or disposal as shown in FIG. 15. The $C_2F_6$-enriched (high boiling point) condensate remaining within the cold trap 25 is then vaporized and reclaimed in stream 280, which is sent to a separate storage vessel (not shown).

Figure 16:
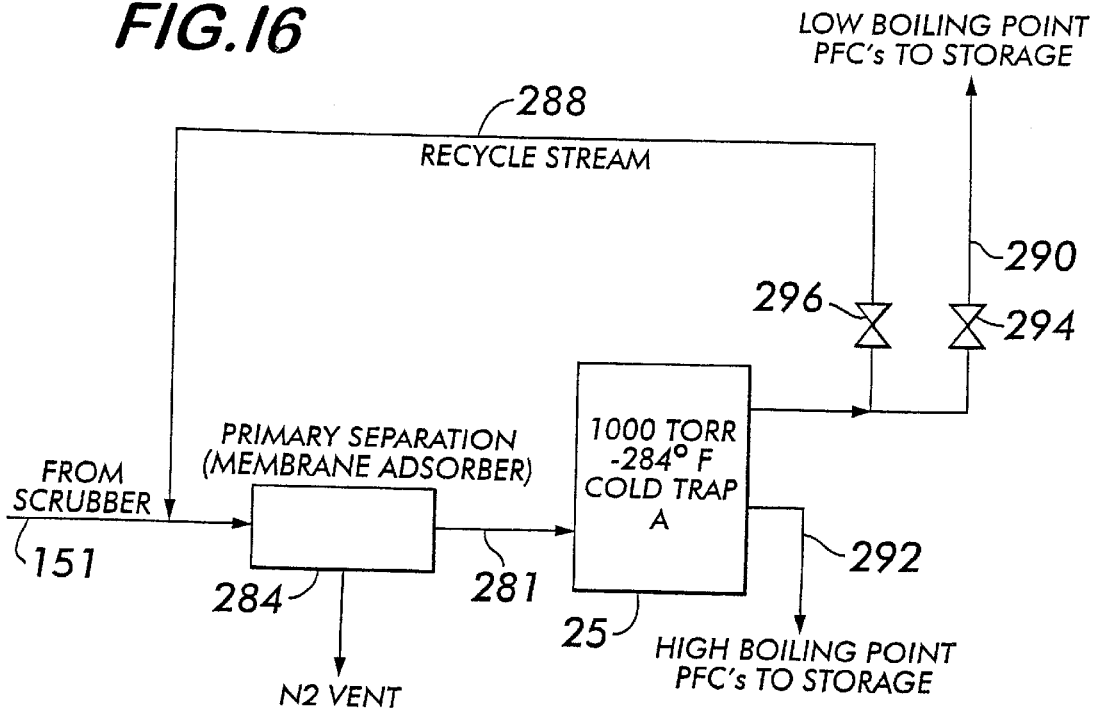

The purity of the $C_2F_6$ In the collected condensate can also be enhanced using staged re-warming of the condensate. An arrangement of this third embodiment is shown in FIG. 16. Under this third embodiment, an influent stream 151 is received from a scrubber (not shown) by a cold trap 25 (Cold Trap A) previously cooled to a predetermined temperature, e.g., approximately −176° C., and maintained at a pressure of approximately 1000 torr. An effluent 281 depleted of $N_2$ exits a primary separation device 284 and enters the cold trap 25 wherein perfluorocarbon enriched condensate is collected in the cold trap 25. A non-condensable, $N_2$-enriched vapor flows through a recycle line 288. Alternatively, the non-condensable, $N_2$-enriched vapor may be vented to the atmosphere. After the PFC-enriched condensate is collected in the cold trap 25, the recycle line 288 is isolated from the cold trap 25 by valve 296.

During the second process step, the condensate is warmed to a temperature sufficient to vaporize the more volatile (low boiling point) perfluorocarbons from the condensate, leaving a $C_2F_6$-enriched condensate. Valve 294 is opened and the more volatile perfluorocarbons (low boiling point) in stream 290 are sent to storage for further purification or disposal. The $C_2F_6$-enriched high boiling point condensate is then revaporized and reclaimed in stream 292, which is sent to a separate storage vessel (not shown).

A combination of staged cooling/evacuation and staged re-warming can also be used to produce higher purity $C_2F_6$ in the condensate using only one cold trap.

Condensation of all PFCs ($C_2F_6$, $CF_4$, $NF_3$, etc.) may, under some operating conditions, result in the formation of a slush (solid/liquid) condensate. The solid material should contain a high proportion of the higher boiling point compounds, such as $C_2F_6$, while the liquid material should contain predominantly lower boiling point compounds. In this case, it may be possible to recover relatively high purity $C_2F_6$ by separating the solid material from the liquid using, for example, filtration at cryogenic temperatures. The separated solid and liquid phases can then be vaporized separately to form relatively high purity $C_2F_6$.

The method of the present invention for condensing perfluorocarbons from reactive gas mixtures can be applied on a facility-wide scale by combining tool effluent streams into a single large cold trap system. However, the method of the present invention can also be applied on a small scale. A small cold trap system can be dedicated to a single semiconductor processing tool. After $N_2$ dilution at the vacuum pump, each processing chamber has a typical effluent stream flow rate of only approximately 50 to 100 standard liters per minute (1.8 to 3.5 s.c.f.m.). The reclaimed perfluorocarbon compounds and reactive gas mixture from the processing chamber can then be sent to a central storage system for the entire semiconductor fabrication facility. A small scrubber unit should be placed upstream of the cold traps to remove corrosive compounds.

Cold trapping is advantageous because cold trap systems are highly reliable and economical to operate. Cooling can be provided by on-site cryogenic air separation units. Membrane and adsorption systems can suffer from progressive fouling or poisoning from impurities. There is no comparable deterioration effect in cold trap devices. Adsorption and membrane systems also produce a significant resistance to flow. The resulting pressure drop requires high cost compression equipment. Cold trap systems produce comparatively little pressure drop during operation. Distillation, adsorption and membrane methods require high cost equipment. Cold trapping equipment is comparatively low cost.

Cooling for the present invention can be provided at low cost at semiconductor fabrication facilities by liquid nitrogen from nearby air separation plants or bulk liquid nitrogen storage vessels. Also, lower temperature cooling equipment does not require noise abatement, does not contaminate the process stream with additional particulate or molecular contamination, and does not tend to substantially reduce the reliability of the perfluorocarbon compound recovery process.

Although this invention has been illustrated by reference to specific embodiments and variations, it will be apparent to those skilled in the art that various changes and modifications may be made which clearly fall within the scope of the invention.

What is claimed is:

1. A process for separating perfluorocarbon compounds from a gas mixture containing a plurality of perfluorocarbon compounds, said process comprising the steps of:
    a. passing an incoming stream of said gas mixture containing a plurality of perfluorocarbon compounds into a cold trap;
    b. cooling said gas mixture to a temperature below $-100°$ C. within said cold trap so that a condensate is produced within said cold trap, said condensate being enriched in at least one perfluorocarbon compound; and,
    c. withdrawing from said cold trap said condensate enriched in said at least one perfluorocarbon compound.

2. A process as in claim 1, wherein said cold trap comprises a first cold trap and a second cold trap and wherein said cooling step (b) is carried out in multiple cooling stages comprising the sub-steps of:
    d. cooling said gas mixture within said first cold trap to produce a first condensate enriched in a first perfluorocarbon compound and a non-condensed stream;
    e. flowing said non-condensed stream to said second cold trap; and,
    f. cooling said non-condensed stream within said second cold trap to produce a second condensate enriched in at least one other perfluorocarbon compound;
and wherein said withdrawing step (c) comprises the sub-steps of:
    g. withdrawing from said first cold trap said first condensate; and,
    h. withdrawing from said second cold trap said second condensate.

3. A process as in claim 2, wherein said first cold trap is cooled to a temperature of approximately $-139°$ C. and is maintained at a pressure of approximately 100 torr and wherein said second cold trap is cooled to a temperature of approximately $-181°$ C. and is maintained at a pressure of approximately 100 torr.

4. A process as in claim 2, wherein said first cold trap is cooled to a temperature of approximately $-154°$ C. and is maintained at a pressure of approximately 100 torr and wherein said second cold trap is cooled to a temperature of approximately $-181°$ C. and is maintained at a pressure of approximately 100 torr.

5. A process as in claim 1, wherein said cooling step (b) is carried out within said cold trap at a temperature of approximately $-173°$ C. and at a pressure of approximately 2300 torr.

6. A process as in claim 1, wherein said cooling step (b) is carried out at a pressure between about 1 torr and about 2300 torr.

7. A process as in claim 6, wherein said cooling step (b) is carried out at a temperature between about $-100°$ C. and about $-190°$ C.

8. A process as in claim 1, wherein said cooling step (b) is carried out at a preferred temperature of approximately $-176°$ C.

9. A process as in claim 1, wherein said incoming stream of said gas mixture includes atmospheric gases and wherein immediately prior to said cooling step (b), said process comprises the further step of membrane treating the incoming stream of said gas mixture in a membrane separation step to separate atmospheric gases from said gas mixture to provide a gas mixture enriched in a plurality of perfluorocarbon compounds for passing into said cold trap.

10. A process as in claim 9, wherein said gas mixture includes corrosive components and wherein immediately prior to said membrane separation step, said process comprises the further step of scrubbing the incoming stream of said gas mixture in a scrubber to separate said corrosive components from said gas mixture.

11. A process as in claim 9, wherein said membrane separation step is carried out in multiple stages.

12. A process as in claim 1, wherein said incoming stream of said gas mixture includes atmospheric gases and wherein immediately prior to said cooling step (b), said process comprises the further step of adsorbing the incoming stream of said gas mixture in an adsorption step to separate atmospheric gases from said gas mixture to provide a gas mixture enriched in a plurality of perfluorocarbon compounds for passing to said cold trap.

13. A process as in claim 12, wherein said gas mixture includes corrosive components and wherein immediately prior to said adsorption step, said process comprises the further step of scrubbing the incoming stream of said gas mixture in a scrubber to separate said corrosive components from said gas mixture for passing to said cold trap.

14. A process as in claim 12, wherein said atmospheric gases separated om said gas mixture comprises $N_2$.

15. A process as in claim 1, wherein said withdrawing step (c) comprises the sub-steps of:
    d. interrupting flow of said incoming stream of said gas mixture to said cold trap and sealing said cold trap;
    e. withdrawing from said cold trap a non-condensed vapor remaining within said cold trap after sealing;
    f. warming said condensate enriched in said at least one perfluorocarbon within said cold trap to a vapor stream; and,
    g. removing said vapor stream from said cold trap.

16. A process as in claim 15, wherein said sub-step of removing said vapor stream from said cold trap includes the sub-step of flowing said vapor stream through a surge vessel and compressor and into a pressurized storage vessel.

17. A process as in claim 15, wherein said sub-step of removing said vapor stream from said cold trap includes the sub-step of isochorically heating said condensate to a sufficient temperature to provide a driving force to flow said heated condensate into a storage vessel without use of a surge vessel or compressor.

18. A process as in claim 17, wherein said vapor stream is a mixture comprising approximately 70% $C_2F_6$, approximately 24% $CF_4$ and approximately 6% $N_2$.

19. A process as in claim 15, wherein said gas mixture is cooled within said cold trap by thermally contacting said cold trap with a coolant medium.

20. A process as in claim 19, wherein said coolant medium is a cryogen.

21. A process as in claim 20, wherein said cryogen is cold gaseous $N_2$ produced from liquid $N_2$.

22. A process as in claim 19, wherein said coolant medium is contained within a closed-cycle cryogenic refrigeration system.

23. A process as in claim 19, wherein said step of warming said condensate within said cold trap includes the sub-step of removing said cold trap from contact with said coolant medium.

24. A process as in claim 19, wherein said step of warming said condensate within said cold trap includes the sub-step of exposing said cold trap to a source of heat.

25. A process as in claim 24, wherein said source of heat is warm gaseous $N_2$.

26. A process as in claim 24, wherein said source of heat is an electric heater.

27. A process as in claim 1, wherein said incoming stream of said gas mixture comprises the perfluorocarbon compounds $C_2F_6$, $CF_4$, $NF_3$, $SF_6$, $CHF_3$, $C_3F_8$, $CH_3F$, $C_2HF_5$, the reactive compounds HF, $F_2$, $COF_2$, $SiF_4$, $SiH_4$ and the atmospheric gases $N_2$, $O_2$, $CO_2$, $H_2O$ and $N_2O$.

28. A process as in claim 1, wherein following said withdrawing step (c), said process comprises the additional step of recirculating said non-condensed stream to said passing step (a).

29. A process as in claim 1, wherein following said withdrawing step (c), said process comprises the additional step of venting said non-condensed stream to atmosphere.

30. A process as in claim 1, wherein said cold trap comprises a first cold trap, a second cold trap and a third cold trap and wherein said cooling step (b) is carried out in multiple cooling stages comprising the sub-steps of:
   d. cooling said gas mixture within said first cold trap to produce a first condensate enriched in a plurality of perfluorocarbon compounds and a first non-condensed stream;
   e. vaporizing and flowing said first condensate to a second cold trap;
   f. cooling said first condensate within second cold trap to produce a second condensate enriched in a first perfluorocarbon compound and a second non-condensed stream;
   g. flowing said second non-condensed stream to a third cold trap;
   h. cooling said second non-condensed stream within said third cold trap to produce a third condensate enriched in at least one other perfluorocarbon compound;
and wherein said withdrawing step (c) comprises the sub-steps of:
   i. withdrawing from said second cold trap said second condensate; and,
   j. withdrawing from said third cold trap said third condensate.

31. A process as in claim 30, wherein said first cold trap is cooled to a temperature of approximately −173° C. and is maintained at a pressure of approximately 2300 torr and wherein said second cold trap is cooled to a temperature of approximately −139° C. and is maintained at a pressure of approximately 100 torr and wherein said third cold trap is cooled to a temperature of approximately −181° C. and is maintained at a pressure of approximately 100 torr.

32. A process as in claim 1, wherein said cooling step (b) is carried out within a cold trap at a temperature of approximately −176° C. and a pressure of approximately 1000 torr.

33. A process as in claim 1, wherein said cold trap comprises a first cold trap and a second cold trap and wherein said cooling step (b) is carried out in multiple cooling stages comprising the sub-steps of:
   d. cooling said gas mixture within said first cold trap to produce a first condensate enriched in a plurality of perfluorocarbon compounds and a first non-condensed stream;
   e. vaporizing and flowing said first condensate to a second cold trap; and,
   f. cooling said first condensate within said second cold trap to produce a second condensate enriched in a first perfluorocarbon compound and second non-condensed stream;
and wherein said withdrawing step (c) comprises the sub-steps of:
   g. withdrawing from said second cold trap said second condensate.

34. A process as in claim 33, wherein said first cold trap is cooled to a temperature of approximately −173° C. and is maintained at a pressure of approximately 2300 torr and wherein said second cold trap is cooled to a temperature of approximately −139° C. and is maintained at a pressure of approximately 100 torr.

35. A process as in claim 33, wherein said first condensate comprises $N_2$, $C_2F_6$ and $CF_4$ and wherein said first non-condensed stream comprises $N_2$, $C_2F_6$ and $CF_4$ and wherein said second condensate comprises $C_2F_6$.

36. A process as in claim 1, wherein immediately following said withdrawing step (c), said process comprises the further step of membrane treating said non-condensed stream depleted of said at least one perfluorocarbon compound.

37. A process as in claim 36, wherein said membrane treating step is carried out in multiple stages.

38. A process as in claim 1, wherein immediately prior to said cooling step (b), said process comprises the further step of membrane treating the incoming stream of said gas mixture in a membrane separation step and wherein immediately following said withdrawing step (c), said process comprises the further step of membrane treating said non-condensed stream depleted of said at least one perfluorocarbon compound.

39. A process as in claim 38, wherein said membrane treating step prior to said cooling step (b) is carried out in multiple stages.

40. A process as in claim 38, wherein said membrane treating step following said withdrawing step (c) is carried out in multiple stages.

41. A process as in claim 38, wherein said membrane treating step prior to said cooling step (b) is carried out in multiple stages and wherein said membrane treating step following said withdrawing step (c) is carried out in multiple stages.

42. A process as in claim 1, wherein said at least one perfluorocarbon compound is $C_2F_6$.

43. A process as in claim 1, wherein said plurality of perfluorocarbon compounds comprises $C_2F_6$ and $CF_4$.

44. A process as in claim 1, wherein said cooling step (b) produces a cooled non-condensed gas and wherein prior to said cooling step (b), said process comprises the further step of withdrawing said non-condensed gas from said cold trap and pre-cooling the incoming stream of said gas mixture by contacting it with said cooled non-condensed gas produced during said cooling step (b).

45. A process as in claim 44, wherein a recuperative heat exchanger is employed in contacting said non-condensed gas with the incoming stream of said gas mixture.

46. A process as in claim 1, wherein prior to said cooling step (b), said process comprises the further step of precooling the incoming stream of said gas mixture by contacting it with a cryogenic source.

47. A process for separating perfluorocarbon compounds from a gas mixture, said process comprising the steps of:
   a. passing an incoming stream of said gas mixture into a cold trap, said gas mixture containing a plurality of perfluorocarbon compounds;
   b. cooling said gas mixture to a temperature below −100° C. within said cold trap so that a condensate is produced within said cold trap, said condensate being enriched in a first set of perfluorocarbon compounds having lower boiling points and a second set of perfluorocarbon compounds having higher boiling points than said first set;
   c. withdrawing from said cold trap a non-condensed gas stream depleted of said plurality of perfluorocarbon compounds;
   d. reducing pressure within said cold trap to a predetermined amount to withdraw from said condensate within said cold trap said first set of perfluorocarbon compounds and to retain within said cold trap said second set of perfluorocarbon compounds; and,
   e. withdrawing from said cold trap said second set of perfluorocarbon compounds.

48. A process for separating perfluorocarbon compounds from a gas mixture, said process comprising the steps of:
   a. passing an incoming stream of said gas mixture into a cold trap, said gas mixture containing a plurality of perfluorocarbon compounds;
   b. cooling said gas mixture to a temperature below −100° C. within said cold trap so that a condensate is produced within said cold trap, said condensate being enriched in a first set of perfluorocarbon compounds having lower boiling points and a second set of perfluorocarbon compounds having higher boiling points than said first set;
   c. withdrawing from said cold trap a non-condensed gas stream depleted of said plurality of perfluorocarbon compounds;
   d. warming said cold trap to a predetermined temperature higher than the boiling points of said first set of perfluorocarbon compounds but lower than the boiling points of said second set of perfluorocarbon compounds, to withdraw from said condensate within said cold trap said first set of perfluorocarbon compounds and to retain within said cold trap said second set of perfluorocarbon compounds; and,
   e. withdrawing from said cold trap said second set of perfluorocarbon compounds.

49. An apparatus for separating perfluorocarbon compounds from a gas mixture, said apparatus comprising:
   a. means passing an incoming stream of said gas mixture into a cold trap, said gas mixture containing a plurality of perfluorocarbon compounds;
   b. means cooling said gas mixture to a temperature below −100° C. within said cold trap so that a condensate is produced within said cold trap, said condensate being enriched in a first set of perfluorocarbon compounds having lower boiling points and a second set of perfluorocarbon compounds having higher boiling points than said first set;
   c. means withdrawing from said cold trap a non-condensed gas stream depleted of said plurality of perfluorocarbon compounds;
   d. means for reducing pressure within said cold trap to a predetermined amount to withdraw from said condensate within said cold trap said first set of perfluorocarbon compounds and to retain within said cold trap said second set of perfluorocarbon compounds;
   e. means withdrawing from said cold trap said second set of perfluorocarbon compounds.

50. An apparatus for separating perfluorocarbon compounds from a gas mixture, said apparatus comprising:
   a. means for passing an incoming stream of said gas mixture into a cold trap, said gas mixture containing a plurality of perfluorocarbon compounds;
   b. means for cooling said gas mixture to a temperature below −100° C. within said cold trap so that a condensate is produced within said cold trap, said condensate being enriched in a first set of perfluorocarbon compounds having lower boiling points and a second set of perfluorocarbon compounds having higher boiling points than said first set;
   c. means for withdrawing from said cold trap a non-condensed gas stream depleted of said plurality of perfluorocarbon compounds;
   d. means for warming said cold trap to a predetermined temperature higher than the boiling points of said first of perfluorocarbon compounds set but lower than the boiling points of said second set of perfluorocarbon compounds, to withdraw from said condensate within said cold trap said first set of perfluorocarbon compounds and to retain within said cold trap said second set of perfluorocarbon compounds;
   e. means for withdrawing from said cold trap said second set of perfluorocarbon compounds.

* * * * *